(12) United States Patent
Horiguchi

(10) Patent No.: US 12,233,870 B2
(45) Date of Patent: Feb. 25, 2025

(54) VEHICLE DRIVING ASSISTANCE APPARATUS

(71) Applicant: SUBARU CORPORATION, Tokyo (JP)

(72) Inventor: Harunobu Horiguchi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 318 days.

(21) Appl. No.: 18/059,050

(22) Filed: Nov. 28, 2022

(65) Prior Publication Data

US 2023/0202479 A1    Jun. 29, 2023

(30) Foreign Application Priority Data

Dec. 27, 2021  (JP) ................................ 2021-213300

(51) Int. Cl.
   *B60W 30/165*    (2020.01)
   *B60W 30/18*     (2012.01)

(52) U.S. Cl.
   CPC .... *B60W 30/165* (2013.01); *B60W 30/18163* (2013.01); *B60W 2554/80* (2020.02); *B60W 2720/106* (2013.01)

(58) Field of Classification Search
   None
   See application file for complete search history.

(56) References Cited

U.S. PATENT DOCUMENTS

| 10,232,768 B2* | 3/2019 | Fujii ...................... B60W 50/10 |
| 10,518,776 B2* | 12/2019 | Kang ..................... B60W 10/06 |
| 12,049,271 B1* | 7/2024 | Saito .................. B62D 15/0255 |
| 2017/0021832 A1* | 1/2017 | Nakadori ................ F02D 41/12 |
| 2017/0232966 A1* | 8/2017 | Ishioka ............... B60W 50/082 701/96 |
| 2019/0256104 A1* | 8/2019 | Shimizu ............ B60W 50/0098 |
| 2020/0118442 A1* | 4/2020 | Iihoshi ..................... B62D 6/00 |
| 2020/0180639 A1* | 6/2020 | Mizoguchi .......... B60W 60/001 |
| 2021/0402999 A1* | 12/2021 | Park .................. B60W 50/0098 |
| 2023/0031030 A1* | 2/2023 | Park ...................... B60W 30/16 |
| 2023/0077036 A1* | 3/2023 | Yamaguchi ........... B60W 30/16 |

(Continued)

FOREIGN PATENT DOCUMENTS

JP    2007-186097 A    7/2007

*Primary Examiner* — Jonathan M Dager
(74) *Attorney, Agent, or Firm* — Rimon P.C.

(57) ABSTRACT

A vehicle driving assistance apparatus includes a traveling environment recognizer and an adaptive cruise controller. The traveling environment recognizer recognizes traveling environment information regarding an outside of a vehicle. Based on the traveling environment information, the adaptive cruise controller performs a follow-up traveling control of causing the vehicle to travel to follow a preceding vehicle, if recognized, and performs a constant-speed traveling control of causing the vehicle to travel at constant speed. If the vehicle starts a lane change to a traveling lane during traveling based on the follow-up traveling control, the adaptive cruise controller keeps a target vehicle speed at a start of the lane change at least until the lane change ends, and thereafter accelerates the vehicle, by setting a set vehicle speed as a new target vehicle speed, and setting a target acceleration rate based on the new target vehicle speed.

13 Claims, 14 Drawing Sheets

(56) References Cited

U.S. PATENT DOCUMENTS

| | | | |
|---|---|---|---|
| 2023/0131761 A1* | 4/2023 | Haydl | B60W 40/04 |
| | | | 701/23 |
| 2023/0150508 A1* | 5/2023 | Nimura | G08G 1/096844 |
| | | | 701/41 |
| 2023/0294694 A1* | 9/2023 | Oshita | B60W 30/143 |
| | | | 701/96 |
| 2023/0356741 A1* | 11/2023 | Hayakawa | B60W 30/18163 |
| 2024/0140423 A1* | 5/2024 | Kobayashi | B60W 30/165 |

* cited by examiner

VEHICLE DRIVING ASSISTANCE APPARATUS

CROSS-REFERENCE TO RELATED APPLICATIONS

The present application claims priority from Japanese Patent Application No. 2021-213300 filed on Dec. 27, 2021, the entire contents of which are hereby incorporated by reference.

BACKGROUND

The disclosure relates to a vehicle driving assistance apparatus configured to perform an adaptive cruise control.

To reduce the burden of a driver's driving operation and to improve safety, driving assistance apparatuses configured to assist the driver's driving operation have been put to practical use in recent vehicles such as automobiles.

Such a driving assistance apparatus may have the following modes, for example: a manual driving mode in which steering and acceleration or deceleration are performed in accordance with active driving operations performed by the driver; a driving assistance mode of performing a steering assist control and an acceleration or deceleration control assuming active driving operations performed by the driver; and a driving assistance mode, i.e., an automatic driving mode, of causing the vehicle to travel without requiring the driver's driving operation.

Driving assistance control in each driving assistance mode is implemented by, for example, an adaptive cruise control (ACC) and a lane keep control, e.g., an active lane keep centering (ALKC) control. Such driving assistance control makes it possible to cause the vehicle to travel automatically along a lane, while keeping a distance between the vehicle and a preceding vehicle.

In the adaptive cruise control, as disclosed in Japanese Unexamined Patent Application Publication No. 2007-186097, for example, if a preceding vehicle is detected ahead on a lane on which the own vehicle is traveling, a follow-up traveling control following the preceding vehicle is performed. In the follow-up traveling control, a target acceleration rate to be used to set a deviation between a preset target inter-vehicle distance and the current inter-vehicle distance to zero is calculated on the basis of, for example, a relative speed and the inter-vehicle distance between the own vehicle and the preceding vehicle. The acceleration or deceleration control corresponding to the target acceleration rate is performed, which makes it possible to, in the follow-up traveling control, cause the own vehicle to follow the preceding vehicle while keeping the target inter-vehicle distance.

In contrast, in the adaptive cruise control, a constant-speed traveling control is performed if no preceding vehicle is detected ahead on a lane on which the own vehicle travels. In the constant-speed traveling control, a target acceleration rate to be used to set a speed difference between the current vehicle speed of the own vehicle and a set vehicle speed to zero is calculated. The acceleration or deceleration control corresponding to the target acceleration rate is performed, which makes it possible to cause the own vehicle to travel at the set vehicle speed in the constant-speed traveling control.

Such an adaptive cruise control may also be applied when the own vehicle makes a lane change. In a state in which the own vehicle is traveling to follow a preceding vehicle, the vehicle speed of the own vehicle is generally lower than the set vehicle speed. A lane change is generally performed on the assumption that no preceding vehicle is present within a set distance on an adjacent lane to which the lane change is to be made. Accordingly, in a case of making a lane change from a state in which the own vehicle is traveling to follow a preceding vehicle, the lane change generally involves increase of the vehicle speed of the own vehicle to the set vehicle speed by the adaptive cruise control.

SUMMARY

An aspect of the disclosure provides a vehicle driving assistance apparatus including a traveling environment recognizer and an adaptive cruise controller. The traveling environment recognizer is configured to recognize traveling environment information regarding an outside of a first vehicle to which the vehicle driving assistance apparatus is to be applied. The adaptive cruise controller is configured to, on the basis of the traveling environment information recognized by the traveling environment recognizer, perform, in a case where a preceding vehicle is recognized ahead of the first vehicle, a follow-up traveling control of causing the first vehicle to travel to follow the preceding vehicle at a target vehicle speed set depending on a vehicle speed of the preceding vehicle, and perform, in a case where no preceding vehicle is recognized ahead of the first vehicle, a constant-speed traveling control of causing the first vehicle to travel at constant speed by setting, as the target vehicle speed, a set vehicle speed inputted by a driver who drives the first vehicle. The adaptive cruise controller is configured to, in a case where the first vehicle starts a lane change to a traveling lane during traveling based on the follow-up traveling control, keep the target vehicle speed at a start of the lane change at least until the lane change ends, and thereafter accelerate the first vehicle, by setting the set vehicle speed as a new target vehicle speed, and setting a target acceleration rate based on the new target vehicle speed.

An aspect of the disclosure provides a vehicle driving assistance apparatus including a traveling environment recognizer and circuitry. The traveling environment recognizer is configured to recognize traveling environment information regarding an outside of a first vehicle to which the vehicle driving assistance apparatus is to be applied. The circuitry is configured to, on the basis of the traveling environment information recognized by the traveling environment recognizer, perform, in a case where a preceding vehicle is recognized ahead of the first vehicle, a follow-up traveling control of causing the first vehicle to travel to follow the preceding vehicle at a target vehicle speed set depending on a vehicle speed of the preceding vehicle, and perform, in a case where no preceding vehicle is recognized ahead of the first vehicle, a constant-speed traveling control of causing the first vehicle to travel at constant speed by setting, as the target vehicle speed, a set vehicle speed inputted by a driver who drives the first vehicle. The circuitry is configured to, in a case where the first vehicle starts a lane change to a traveling lane during traveling based on the follow-up traveling control, keep the target vehicle speed at a start of the lane change at least until the lane change ends, and thereafter accelerate the first vehicle, by setting the set vehicle speed as a new target vehicle speed, and setting a target acceleration rate based on the new target vehicle speed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
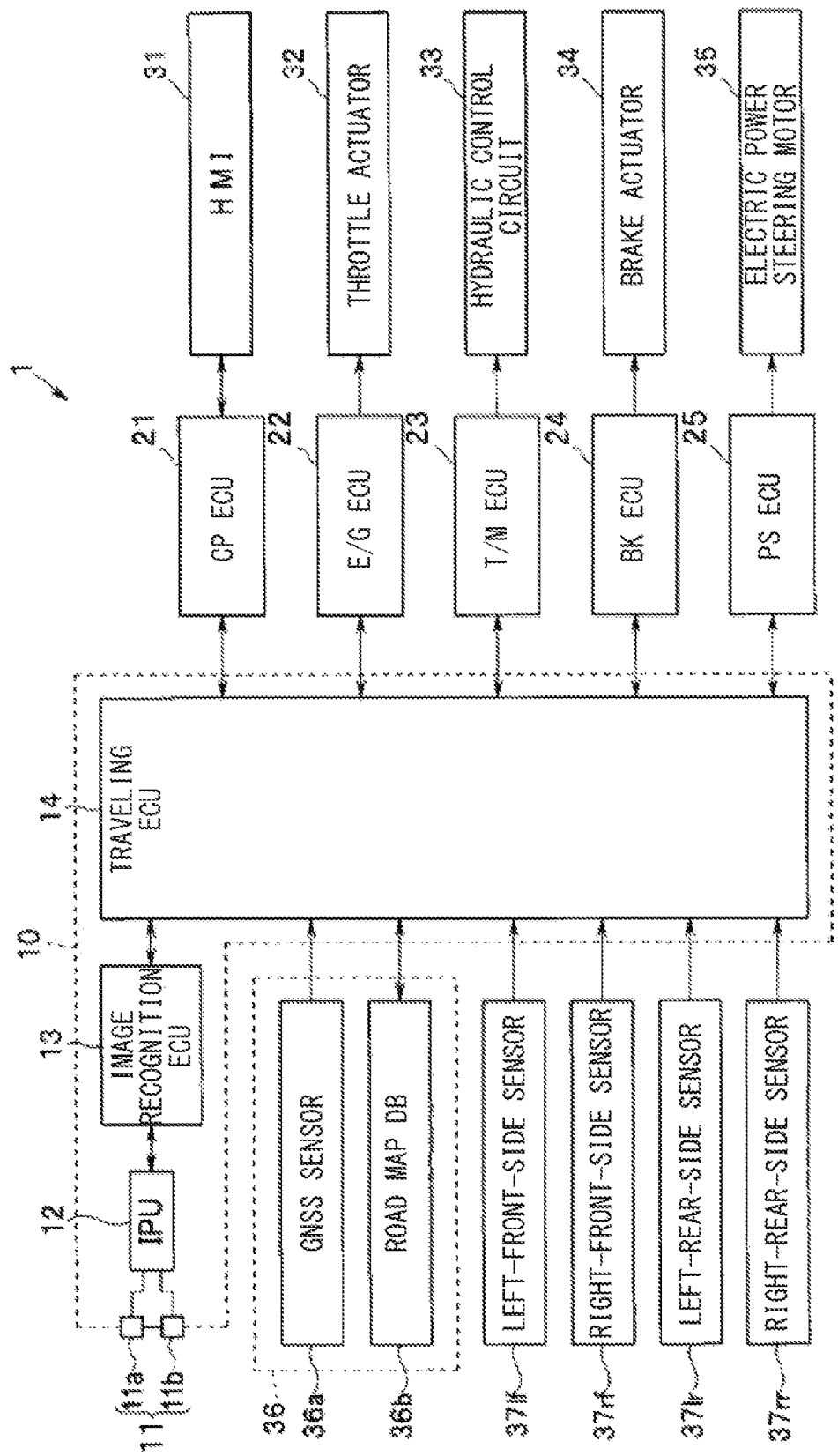
FIG. 1 is an overall configuration diagram illustrating a driving assistance apparatus.

When the own vehicle makes a lane change to an adjacent lane, a relative relationship between the own vehicle and a surrounding vehicle, for example, changes variously. Accordingly, in a case where acceleration involved in the lane change is uniformly performed by an adaptive cruise control, a vehicle speed of the own vehicle can fail to be an appropriate vehicle speed for avoidance of interference with the surrounding vehicle. In such a case, further acceleration or deceleration can be necessary to avoid the interference with the surrounding vehicle.

It is desirable to provide a vehicle driving assistance apparatus that makes it possible to appropriately avoid interference with a surrounding vehicle on a new lane after a lane change.

In the following, some example embodiments of the disclosure are described in detail with reference to the accompanying drawings. Note that the following description is directed to illustrative examples of the disclosure and not to be construed as limiting to the disclosure. In each of the drawings referred to in the following description, elements have different scales in order to illustrate the respective elements with sizes recognizable in the drawings. Therefore, factors including, without limitation, the number of each of the elements, a dimension of each of the elements, a material of each of the elements, a ratio between the elements, relative positional relationship between the elements, and any other specific numerical value are illustrative only for easier understanding and not to be construed as limiting to the disclosure unless otherwise stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 2:
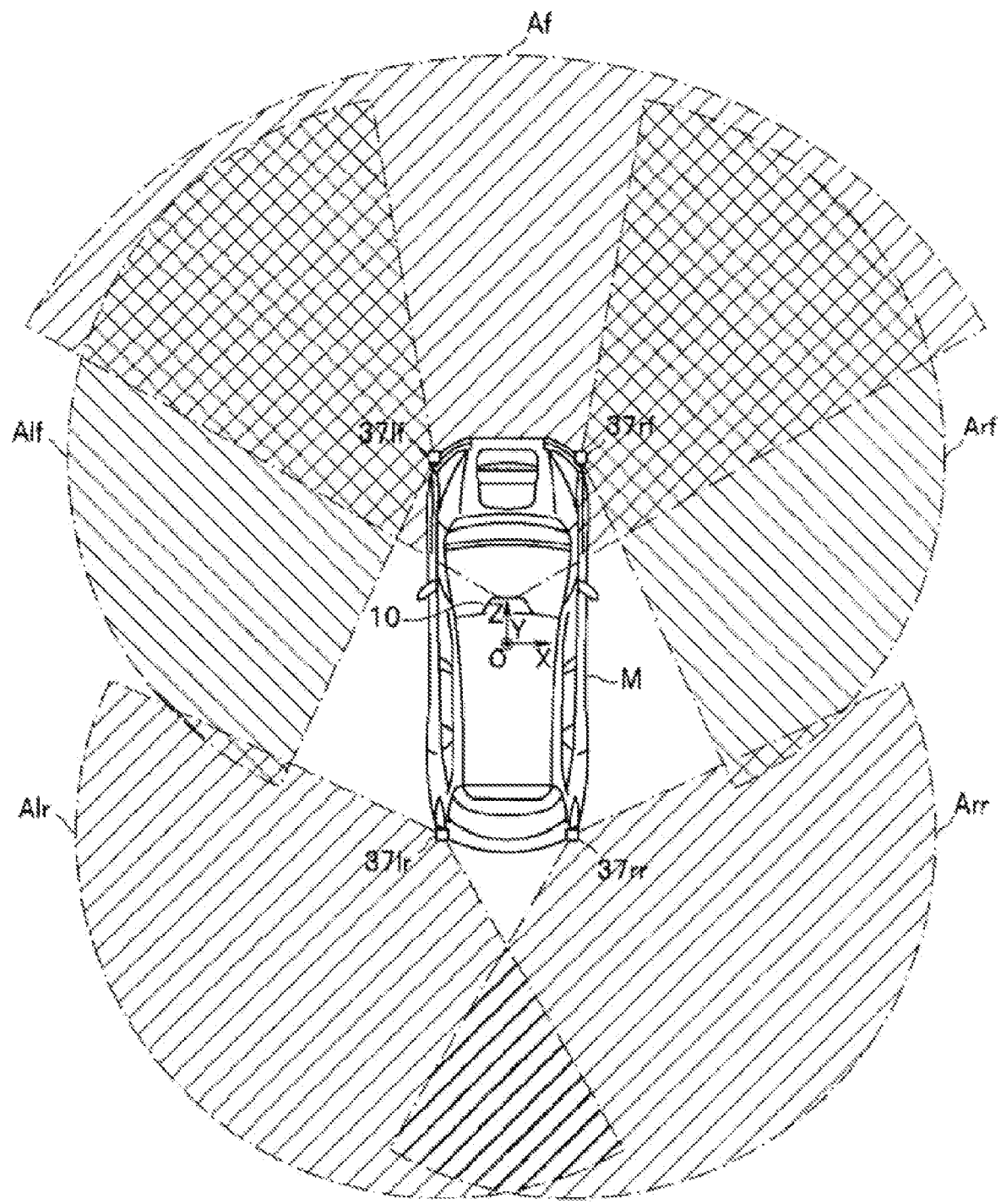
FIG. 2 is an explanatory diagram illustrating regions that are monitored by a stereo camera and radars.

As illustrated in FIGS. 1 and 2, a driving assistance apparatus 1 may include, for example, a camera unit 10 fixed to the upper middle of a front part in a vehicle compartment of a vehicle M. The vehicle M may also be referred to as an own vehicle M. In one embodiment, the own vehicle M may serve as a "first vehicle".

The camera unit 10 may include a stereo camera 11, an image processing unit (IPU) 12, an image recognition unit (image recognition ECU) 13, and a traveling control unit (traveling ECU) 14.

The stereo camera 11 may include a main camera 11a and a sub-camera 11b. The main camera 11a and the sub-camera 11b may include, for example, a complementary metal-oxide-semiconductor (CMOS), and may be disposed at symmetrical positions with respect to a midpoint in a vehicle-width direction. The main camera 11a and the sub-camera 11b may perform stereo imaging of a traveling environment of a front region Af outside the vehicle (see FIG. 2) from different viewpoints, in predetermined imaging cycles synchronized with each other.

The IPU 12 may perform predetermined image processing on a traveling environment image captured by the stereo camera 11, and detect edges of various targets, including a three-dimensional object or a lane line on a road, on the image. The IPU 12 may determine distance information on the basis of an amount of shift in position between corresponding edges on left and right images. The IPU 12 may thus generate image information that includes the distance information. In other words, the IPU 12 may generate distance image information.

On the basis of the distance image information, for example, received from the IPU 12, the image recognition ECU 13 may determine a road curvature [1/m] of each of lane lines that define left and right of a lane on which the own vehicle M travels along an own-vehicle traveling course, and a width (i.e., a lane width) between the left and right lane lines. The image recognition ECU 13 may also determine the road curvature of each of lane lines that define left and right of, for example, a lane adjacent to the lane on which the own vehicle M travels, and the width between the left and right lane lines. The road curvature and the lane width may be determined by any of various known methods. For example, the image recognition ECU 13 may determine the road curvature by recognizing the left and right lane lines on the basis of the distance image information, and determining the curvature of each of the left and right lane lines for each predetermined section. The right and left lane lines may be recognized through a binarization process that utilizes a difference in luminance. The curvature of each of the right and left lane lines may be determined through, for example, a curve-approximating expression that is based on a least-square method. Furthermore, the image recognition ECU 13 may calculate the lane width from a difference between the respective curvatures of the left and right lane lines.

The image recognition ECU 13 may calculate, for example, the middle of the lane and an own vehicle lateral position deviation, on the basis of the curvature of each of the left and right lane lines and the lane width. The own vehicle lateral position deviation may be a distance from the middle of the lane to the middle of the own vehicle M in the vehicle-width direction.

The image recognition ECU 13 may also perform predetermined pattern matching, for example, on the distance image information, to recognize a three-dimensional object. Non-limiting examples of the three-dimensional object may include a guard rail and a curbstone that extend along the road, and a surrounding vehicle. In recognizing the three-dimensional object, the image recognition ECU 13 may recognize, for example, a type of the three-dimensional object, a distance to the three-dimensional object, a speed of the three-dimensional object, and a relative speed between the three-dimensional object and the own vehicle M.

These various pieces of information recognized by the image recognition ECU 13 may be outputted to the traveling ECU 14 as traveling environment information.

In one embodiment, the image recognition ECU 13 may thus serve, together with the stereo camera 11 and the IPU 12, as a "traveling environment recognizer" that recognizes the traveling environment information regarding the outside of the vehicle.

The traveling ECU 14 may be a control unit that centrally controls the driving assistance apparatus 1.

The traveling ECU 14 may be coupled, via an in-vehicle communication line such as a controller area network (CAN), to various control units including a cockpit control unit (CP ECU) 21, an engine control unit (E/G ECU) 22, a transmission control unit (T/M ECU) 23, a brake control unit (BK ECU) 24, and a power steering control unit (PS ECU) 25.

Furthermore, the traveling ECU 14 may be coupled to various sensors including a locator unit 36, a left-front-side sensor 37*lf*, a right-front-side sensor 37*rf*, a left-rear-side sensor 37*lr*, and a right-rear-side sensor 37*rr*.

The CP ECU 21 may be coupled to a human-machine interface (HMI) 31 provided around a driver's seat. The HMI 31 may include, for example, an operation switch, a mode switching switch, a steering-wheel touch sensor, a turn signal switch, a driver monitoring system (DMS), a touch panel display, a combination meter, and a speaker. The operation switch may be used for, for example, execution and setting of various driving assistance controls. The mode switching switch may be used for switching of a driving assistance mode. The steering-wheel touch sensor may detect a steering-wheel holding state of a driver who drives the vehicle. The DMS may, for example, recognize the driver's face or detect the driver's line of sight.

Upon receiving a control signal from the traveling ECU 14, the CP ECU 21 may notify the driver as appropriate of various pieces of information regarding, for example, various alerts for a preceding vehicle, an execution status of the driving assistance control, and the traveling environment of the own vehicle M. Such notification may be given by, for example, display or sound outputted via the HMI 31.

In addition, the CP ECU 21 may output, to the traveling ECU 14, various pieces of input information including an on/off operation state for the various driving assistance controls inputted by the driver via the HMI 31, a set vehicle speed Vs for the own vehicle M, and an operation state of the turn signal switch.

The E/G ECU 22 may have an output terminal coupled to, for example, a throttle actuator 32 of an electronic control throttle device. The E/G ECU 22 may have an input terminal coupled to various sensors, including an unillustrated accelerator sensor.

The E/G ECU 22 may drive and control the throttle actuator 32 on the basis of, for example, a control signal from the traveling ECU 14 or a detection signal from the various sensors. The E/G ECU 22 may thus regulate an intake air amount of an engine to generate a desired engine output. In addition, the E/G ECU 22 may output, to the traveling ECU 14, a signal of a factor such as an accelerator position detected by any of the various sensors.

The T/M ECU 23 may have an output terminal coupled to a hydraulic control circuit 33. The T/M ECU 23 may have an input terminal coupled to various sensors, including an unillustrated shift position sensor. The T/M ECU 23 may perform hydraulic control for the hydraulic control circuit 33 on the basis of, for example, an engine torque signal estimated by the E/G ECU 22 or a detection signal from the various sensors. The T/M ECU 23 may thus operate a part such as a friction engagement member or a pulley provided in an automatic transmission, to perform shifting of the engine output at a desired shifting ratio. In addition, the T/M ECU 23 may output, to the traveling ECU 14, a signal of a factor such as a shift position detected by any of the various sensors.

The BK ECU 24 may have an output terminal coupled to a brake actuator 34. The brake actuator 34 may regulate a brake fluid pressure to be applied to a brake wheel cylinder provided on each wheel. The BK ECU 24 may have an input terminal coupled to various sensors, including a brake pedal sensor, a yaw rate sensor, a longitudinal acceleration sensor, and a vehicle speed sensor, which are unillustrated.

The BK ECU 24 may drive and control the brake actuator 34 on the basis of a control signal from the traveling ECU 14 or a detection signal from the various sensors. The BK ECU 24 may thus generate, as appropriate on each wheel, a braking force to be used to perform forcible braking control or yaw rate control, for example, for the own vehicle M. In addition, the BK ECU 24 may output, to the traveling ECU 14, signals of factors including a brake operation state, a yaw rate, a longitudinal acceleration rate, and a vehicle speed (i.e., an own vehicle speed) detected by the various sensors.

The PS ECU 25 may have an output terminal coupled to an electric power steering motor 35. The electric power steering motor 35 may impart a steering torque to a steering mechanism using a rotary power of the motor. The PS ECU 25 may have an input terminal coupled to various sensors, including a steering torque sensor and a steering angle sensor, which are unillustrated.

The PS ECU 25 may drive and control the electric power steering motor 35 on the basis of a control signal from the traveling ECU 14 or a detection signal from the various sensors. The PS ECU 25 may thus generate the steering torque for the steering mechanism. In addition, the PS ECU 25 may output, to the traveling ECU 14, signals of factors including the steering torque and a steering angle detected by the various sensors.

The locator unit 36 may include a global navigation satellite system (GNSS) sensor 36*a* and a high-precision road map database (road map DB) 36*b*.

The GNSS sensor 36*a* may receive positioning signals from multiple positioning satellites to measure a position (e.g., a latitude, a longitude, and an altitude) of the own vehicle M.

The road map DB 36*b* may be a large-capacity storage medium such as a hard disk drive (HDD). The road map DB 36*b* may hold high-precision road map information, e.g., a dynamic map. The road map information may include, for example, lane data to be involved in the execution of automatic driving. Non-limiting examples of the lane data may include lane width data, lane center position coordinate data, lane forwarding azimuth angle data, and speed limit data. The lane data may be held at intervals of several meters, in each lane on the road map. The road map DB 36*b* may output, to the traveling ECU 14 as the traveling environment information, the road map information of a range set with reference to the own vehicle position measured by the GNSS sensor 36*a*, for example, on the basis of a request signal from the traveling ECU 14.

In one embodiment, the road map DB 36*b* may thus serve, together with the GNSS sensor 36*a*, as the "traveling environment recognizer" that recognizes the traveling environment information regarding the outside of the vehicle.

The left-front-side sensor 37*lf* and the right-front-side sensor 37*rf* may each include a millimeter-wave radar, for example. The left-front-side sensor 37*lf* and the right-front-side sensor 37*rf* may be, for example, respectively provided on left and right side parts of a front bumper. The left-front-side sensor 37*lf* and the right-front-side sensor 37*rf* may detect, as the traveling environment information, a three-dimensional object present in regions Alf and Arf (see FIG. 2) which are difficult to recognize from the image of the stereo camera 11. The region Alf may be a region obliquely left frontward and sideward of the own vehicle M. The region Arf may be a region obliquely right frontward and sideward of the own vehicle M.

The left-rear-side sensor 37*lr* and the right-rear-side sensor 37*rr* may each include a millimeter-wave radar, for example. The left-rear-side sensor 37*lr* and the right-rear-side sensor 37*rr* may be, for example, respectively provided on left and right side parts of a rear bumper. The left-rear-side sensor 37*lr* and the right-rear-side sensor 37*rr* may detect, as the traveling environment information, a three-dimensional object present in regions Alr and Arr (see FIG. 2) which are difficult to recognize by the left-front-side sensor 37*lf* and the right-front-side sensor 37*rf*. The region Alr may be a region leftward and rearward of the own vehicle M. The region Arr may be a region rightward and rearward of the own vehicle M.

In a case where each radar includes a millimeter-wave radar, the millimeter-wave radar may transmit a radio wave, and perform analysis of a reflected wave from an object, to detect mainly a three-dimensional object such as a parallel-traveling vehicle or a subsequent vehicle. In one example, each radar may detect, as information regarding the three-dimensional object, a width of the three-dimensional object, a position (e.g., a relative position to the own vehicle M) of a representative point of the three-dimensional object, and a speed of the three-dimensional object.

In one embodiment, the left-front-side sensor 37*lf*, the right-front-side sensor 37*rf*, the left-rear-side sensor 37*lr*, and the right-rear-side sensor 37*rr* may thus serve as the "traveling environment recognizer" that recognizes the traveling environment information regarding the outside of the vehicle.

Note that coordinates of each target outside the vehicle included in the recognized traveling environment information may all be converted by the traveling ECU 14 into, for example, coordinates of a three-dimensional coordinate system having an origin at the center of the own vehicle M (see FIG. 2). The recognized traveling environment information may include the traveling environment information recognized by the image recognition ECU 13, the traveling environment information recognized by the locator unit 36, the traveling environment information recognized by the left-front-side sensor 37*lf*, the traveling environment information recognized by the right-front-side sensor 37*rf*, the traveling environment information recognized by the left-rear-side sensor 37*lr*, and the traveling environment information recognized by the right-rear-side sensor 37*rr*.

The traveling ECU 14 may have, as driving modes, a manual driving mode, a first traveling control mode, a second traveling control mode, and a retreat mode. The first traveling control mode and the second traveling control mode may be modes for traveling control. The traveling ECU 14 may be able to selectively switch between these driving modes on the basis of, for example, a status of operation on the mode switching switch provided in the HMI 31.

The manual driving mode may be a driving mode in which the driver has to hold a steering wheel. For example, the manual driving mode may be a driving mode that allows the own vehicle M to travel in accordance with a driving operation performed by the driver. Non-limiting examples of the driving operation performed by the driver may include a steering operation, an acceleration operation, and a braking operation.

The first traveling control mode may also be a driving mode in which the driver has to hold the steering wheel. For example, the first traveling control mode may be a semi-automatic driving mode that allows the own vehicle M to travel while reflecting the driving operation performed by the driver. The first traveling control mode may be implemented by, for example, the traveling ECU 14 outputting various control signals to the E/G ECU 22, the BK ECU 24, and the PS ECU 25. In the first traveling control mode, controls mainly including an adaptive cruise control (ACC), a lane keep control, e.g., an active lane keep centering (ALKC) control, a lane departure prevention control, e.g., an active lane keep bouncing control, and a lane change control may be performed in appropriate combination. This enables the own vehicle M to travel along a target traveling route. In the first traveling control mode, it is also possible to perform the lane change control when the turn signal switch is operated by the driver.

The adaptive cruise control is basically performed on the basis of the traveling environment information received from, for example, the image recognition ECU 13.

In one example, in a case where a preceding vehicle is recognized ahead of the own vehicle M by, for example, the image recognition ECU 13, the traveling ECU 14 performs a follow-up traveling control as a part of the adaptive cruise control. In the follow-up traveling control, the traveling ECU 14 may set a target inter-vehicle distance Lt and a target vehicle speed Vt on the basis of, for example, a vehicle speed Vl of the preceding vehicle. The traveling ECU 14 may perform an acceleration or deceleration control for the own vehicle M on the basis of the target inter-vehicle distance Lt and the target vehicle speed Vt. This enables the traveling ECU 14 to basically cause the own vehicle M to travel to follow the preceding vehicle, in a state in which an inter-vehicle distance L is kept at the target inter-vehicle distance Lt and a vehicle speed V is kept at the target vehicle speed Vt.

In contrast, in a case where no preceding vehicle is recognized ahead of the own vehicle M by, for example, the image recognition ECU 13, the traveling ECU 14 performs a constant-speed traveling control as a part of the adaptive cruise control. In the constant-speed traveling control, the traveling ECU 14 sets the set vehicle speed Vs inputted by the driver as the target vehicle speed Vt. The traveling ECU 14 may perform the acceleration or deceleration control for the own vehicle M on the basis of the target vehicle speed Vt. This enables the traveling ECU 14 to keep the vehicle speed V of the own vehicle M at the set vehicle speed Vs.

The lane keep control and the lane departure prevention control may be basically performed on the basis of the traveling environment information received from one or both of the image recognition ECU 13 and the locator unit 36. For example, the traveling ECU 14 may perform the lane keep control and the lane departure prevention control for a lane on which the own vehicle M travels, on the basis of information such as lane line information included in the traveling environment information. This enables the traveling ECU 14 to keep the own vehicle M at the middle of the lane.

The lane change control may be basically performed on the basis of the traveling environment information received from the image recognition ECU 13, the left-front-side sensor 37*lf*, the right-front-side sensor 37*rf*, the left-rear-side sensor 37*lr*, and the right-rear-side sensor 37*rr*. The lane change control may be executed, for example, in a case where the turn signal switch is operated by the driver. For example, the traveling ECU 14 may recognize an adjacent lane present in an operation direction of the turn signal switch, on the basis of the traveling environment information. In addition, the traveling ECU 14 may recognize whether an object such as a vehicle that hinders a lane change is present on the adjacent lane. Upon determining that a space that allows for a lane change is present on the adjacent lane, the traveling ECU 14 may perform the lane change control for a lane change to the adjacent lane. The lane change control may be performed in coordination with the adaptive cruise control.

The second traveling control mode may be a driving mode that allows the own vehicle M to travel without requiring the driver to hold the steering wheel or to perform the acceleration operation or the braking operation. For example, the second traveling control mode may be an automatic driving mode that allows the own vehicle M to travel autonomously without requiring the driving operation performed by the driver. The second traveling control mode may be implemented by, for example, the traveling ECU 14 outputting various control signals to the E/G ECU 22, the BK ECU 24, and the PS ECU 25. In the second traveling control mode, controls mainly including the adaptive cruise control, the lane keep control, and the lane departure prevention control may be performed in appropriate combination. This enables the own vehicle M to travel in accordance with a target route, i.e., route map information. In the second traveling control mode, it is also possible to perform the lane change control. Note that, in the second traveling control mode, the lane change control may be automatically performed as appropriate depending on, for example, the traveling environment information of the own vehicle M, without being limited to when the turn signal switch is operated by the driver.

The retreat mode may be a mode that allows the own vehicle M to stop automatically at a location such as a side strip, for example, in a case where: the own vehicle M is traveling in the second traveling control mode; the traveling in the second traveling control mode is not continuable any longer; and it is difficult to have the driver take over the driving operation, i.e., it is difficult to switch the driving mode to the manual driving mode or the first traveling control mode.

In the driving modes described above, the traveling ECU 14 may perform an emergency braking control, e.g., an autonomous emergency braking (AEB) control, as appropriate, for an obstacle such as a vehicle that is likely to come into contact with the own vehicle M.

Furthermore, upon determining that it is difficult to avoid contact with the obstacle by the emergency braking control, the traveling ECU 14 may perform an emergency steering control for avoidance of contact with the obstacle, in place of or together with the emergency braking control.

Next, a detailed description is given of the lane change control in the driving assistance apparatus 1 described above.

In the lane change control, the traveling ECU 14 may determine whether a lane change is to be made. For example, the traveling ECU 14 may determine that a lane change is to be made in a case where the turn signal switch is operated by the driver during execution of the first traveling control mode or the second traveling control mode. In another example, the traveling ECU 14 may determine that a lane change is to be made in a case where, during execution of the second traveling control mode, the own vehicle M is traveling to follow a preceding vehicle and the vehicle speed Vl of the preceding vehicle is lower than the set vehicle speed Vs of the own vehicle M in a predetermined degree. In another example, the traveling ECU 14 may determine that a lane change is to be made in a case where, during execution of the second traveling control mode, a subsequent vehicle traveling at a vehicle speed Vf higher than the vehicle speed V of the own vehicle M in a predetermined degree approaches behind the own vehicle M.

Upon determining that a lane change is to be made, the traveling ECU 14 may determine whether a lane change is possible. For example, the traveling ECU 14 may determine whether a lane change is possible by comprehensively determining various conditions, including whether a section on a road where the own vehicle M is currently traveling is a section in which a lane change is allowed, and whether an object such as another vehicle is present, on an adjacent lane to which the lane change is to be made, within a range of a front-rear distance set with reference to the own vehicle M. The front-rear distance may be, for example, 45 meters in front of and behind the own vehicle M.

In a case where the traveling ECU 14 determines that a lane change is to be made and determines that a lane change to the adjacent lane is possible, the traveling ECU 14 may set, for example, the middle of the adjacent lane to which the lane change is to be made as a target lateral position.

The traveling ECU 14 may also set, for example, a target route that allows the own vehicle M to reach the target lateral position in a set time period, e.g., within three seconds. In setting the target route, the traveling ECU 14 may, for example, divide a section from a lateral position (i.e., a start lateral position) of the own vehicle M to the target lateral position, into a steering-increase section, or a first section, and a steering-decrease section, or a second section. The steering-increase section may be, for example, a section from the start lateral position to an intermediate lateral position. The intermediate lateral position may be a position between the start lateral position and the target lateral position. The steering-increase section may be a section mainly for movement of the own vehicle M to the adjacent lane. The steering-decrease section may be, for example, a section from the intermediate lateral position to the target lateral position. The steering-decrease section may be a section mainly for movement of the own vehicle M to the middle of the adjacent lane and resolving of a relative-to-lane yaw angle caused by the lane change.

The traveling ECU 14 may set the target route for each of the divided sections by using preset jerk characteristics, for example. The jerk may be a rate of change in the acceleration rate.

The traveling ECU 14 may drive the electric power steering motor 35 via the PS ECU 25 to cause the own vehicle M to travel in accordance with the target route.

Described next is the adaptive cruise control, e.g., a vehicle speed control, in a case where the own vehicle M following a preceding vehicle starts the lane change control. The adaptive cruise control during the lane change control may differ between a case where the own vehicle M makes a lane change from a traveling lane to a passing lane and a case where the own vehicle M makes a lane change from the passing lane to the traveling lane.

The traveling lane may refer to, for example, a lane other than the rightmost lane in a case where multiple lanes are provided, on a road where drivers keep to the left by law. The passing lane may refer to, for example, the rightmost lane in a case where multiple lanes are provided, on a road where drivers keep to the left by law. Accordingly, on a road having three lanes on each side illustrated as an example in FIGS. 9 to 14, the first and second lanes from the left side may each serve as the traveling lane, and the third lane from the left side may serve as the passing lane. Note that, on a road where drivers keep to the right by law, the left and right in the definitions of the traveling lane and the passing lane may be reversed.

In a case where the own vehicle M starts a lane change to the traveling lane during follow-up traveling, the traveling ECU 14 keeps the target vehicle speed Vt at the start of the lane change, at least until the lane change ends. It is also possible to keep the target vehicle speed Vt for a predetermined time period (e.g., about several seconds) after the end of the lane change.

After the own vehicle M ends the lane change to the traveling lane, the traveling ECU 14 basically sets the set vehicle speed Vs as the new target vehicle speed Vt. Furthermore, the traveling ECU 14 sets a target acceleration rate at on the basis of the newly set target vehicle speed Vt (and the current vehicle speed V of the own vehicle M), by referring to a preset map, for example. The traveling ECU 14 accelerates the own vehicle M to the target vehicle speed Vt on the basis of the target acceleration rate at. The map for the target acceleration rate at may be set, for example, to make the target acceleration rate at larger as a speed difference between the vehicle speed V of the own vehicle M and the target vehicle speed Vt becomes larger.

Note that, in setting the new target vehicle speed Vt, the traveling ECU 14 may set a reference vehicle speed Vl on the basis of a speed suitable for traffic flow around the own vehicle M, e.g., an average vehicle speed of one or more surrounding vehicles. In a case where the new target vehicle speed Vt is greater than the reference vehicle speed V1, the traveling ECU 14 may correct the new target vehicle speed Vt to a decrease side. In one example, the traveling ECU 14 may reduce the new target vehicle speed Vt to the reference vehicle speed V1.

This enables the own vehicle M to travel at a vehicle speed suitable for the traffic flow, without being accelerated to an excessive vehicle speed even after the lane change.

It also becomes possible to delay time taken until the own vehicle M after the lane change travels parallel beside a vehicle that has been the preceding vehicle before the lane change. This makes it possible to cause the vehicle that has been the preceding vehicle to accurately recognize that the own vehicle M has made the lane change. In addition, even if the vehicle that has been the preceding vehicle makes a lane change to the traveling lane without noticing the presence of the own vehicle M, it is possible to secure time for the own vehicle M to avoid contact with the vehicle that has made the lane change, by emergency braking, for example. In one embodiment, the vehicle that has been the preceding vehicle may serve as a "second vehicle".

The speed such as the average vehicle speed of the one or more surrounding vehicles may be calculated on the basis of the traveling environment information. In another example, the speed such as the average vehicle speed of the one or more surrounding vehicles may be acquired by road-to-vehicle communication with an infrastructure, for example, installed on a road.

In a case where the new target vehicle speed Vt is equal to or less than the reference vehicle speed V1, the traveling ECU 14 may calculate a speed difference $\Delta V$ between the new target vehicle speed Vt and the vehicle speed Vl of the vehicle that has been the preceding vehicle. In a case where the speed difference $\Delta V$ is equal to or greater than a preset first threshold $\Delta Vth1$, the traveling ECU 14 may correct one or both of the new target vehicle speed Vt and the target acceleration rate at based on the new target vehicle speed Vt, to the decrease side.

This makes it possible to delay the time taken until the own vehicle M after the lane change travels parallel beside the vehicle that has been the preceding vehicle before the lane change. This makes it possible to cause the vehicle that has been the preceding vehicle to accurately recognize that the own vehicle M has made the lane change. In addition, even if the vehicle that has been the preceding vehicle makes a lane change to the traveling lane without noticing the presence of the own vehicle M, it is possible to secure the time for the own vehicle M to avoid contact with the vehicle that has made the lane change, by emergency braking, for example.

As described above, in the example embodiment, in a case where the own vehicle M makes a lane change to the traveling lane, the vehicle speed control for avoidance of interference with the vehicle that has been the preceding vehicle before the lane change may be performed.

After the vehicle speed of the own vehicle M is increased to the new target vehicle speed Vt (including the corrected value) by such a vehicle speed control involved in the lane change to the traveling lane, the normal adaptive cruise control may be performed. For example, in a case where a preceding vehicle is newly recognized ahead of the own vehicle M on the lane after the lane change, the traveling ECU 14 may cause the own vehicle M to travel to follow the preceding vehicle. In a case where no preceding vehicle is recognized ahead of the own vehicle M on the lane after the lane change, the traveling ECU 14 may cause the own vehicle M to travel at constant speed at the set vehicle speed Vs.

In contrast, in a case where the own vehicle M starts a lane change to the passing lane during the follow-up traveling following a preceding vehicle, the traveling ECU 14 may basically set the set vehicle speed Vs as the new target vehicle speed Vt. Furthermore, the traveling ECU 14 may set the target acceleration rate at on the basis of the newly set target vehicle speed Vt (and the current vehicle speed V of the own vehicle M), by referring to a preset map, for example. The traveling ECU 14 may thus accelerate the own vehicle M to the target vehicle speed Vt on the basis of the target acceleration rate at. In other words, the traveling ECU 14 may increase the vehicle speed V of the own vehicle M to the newly set target vehicle speed Vt, in parallel with the lane change.

In a case of making a lane change to the passing lane, it may be desired that the own vehicle M quickly accelerate to pass the preceding vehicle. In a case of making a lane change to the passing lane, it may also be desired that, if a subsequent vehicle approaches at high speed from afar on the passing lane, the own vehicle M quickly accelerate to a vehicle speed at which interference with the subsequent vehicle is avoidable.

Hence, the traveling ECU 14 may calculate the speed difference ΔV between the new target vehicle speed Vt and the vehicle speed Vl of the preceding vehicle. In a case where the speed difference ΔV is small in a predetermined degree, the traveling ECU 14 may correct the new target vehicle speed Vt to an increase side. The traveling ECU 14 may set the target acceleration rate at on the basis of the corrected new target vehicle speed Vt, by referring to the preset map, for example. In other words, if the target vehicle speed Vt is corrected to the increase side, the target acceleration rate at may accordingly be corrected to the increase side.

Note that, for the correction of the new target vehicle speed Vt to the increase side, a legal speed limit set for the road may be, for example, set as an upper limit. Accordingly, in a case where the new target vehicle speed Vt, i.e., the set vehicle speed Vs, is set at the legal speed limit, for example, only the target acceleration rate at may be corrected to the increase side.

Correction amounts to be used to correct the target vehicle speed Vt and the target acceleration rate at to the increase side may each be set to become a larger correction amount as the speed difference ΔV becomes smaller, on the basis of a preset map, for example. The upper limit may be a value that allows the own vehicle M to make a lane change safely, e.g., a value that satisfies the jerk characteristics at the time of the lane change.

It may be desired to perform such acceleration involved in a lane change to the passing lane further quickly, in a case where a new subsequent vehicle is recognized during the lane change, as compared with a case where no subsequent vehicle is recognized. In other words, it may be desired to perform acceleration more quickly even from a state in which the speed difference ΔV is relatively small, in a case where a subsequent vehicle is recognized, as compared with a case where no subsequent vehicle is recognized.

Hence, as a threshold for determination of whether to correct the target vehicle speed Vt and the target acceleration rate at to the increase side, different values may be set between a case where no subsequent vehicle is recognized and a case where a subsequent vehicle is recognized. For example, a second threshold ΔVth2 for the speed difference ΔV in a case where no subsequent vehicle is recognized may be set to a value larger than a third threshold ΔVth3 for the speed difference ΔV in a case where a subsequent vehicle is recognized.

In view of the above, the correction amounts to be used to correct the target vehicle speed Vt and the target acceleration rate at to the increase side may also be, for example, set to be relatively larger in a case where a subsequent vehicle is recognized than in a case where no subsequent vehicle is recognized.

As described above, in the example embodiment, in a case where the own vehicle M makes a lane change to the passing lane, at least if a subsequent vehicle is recognized on the passing lane, the vehicle speed control for avoidance of interference with the subsequent vehicle may be performed.

After the vehicle speed of the own vehicle M is increased to the new target vehicle speed Vt (including the corrected value) by such a vehicle speed control involved in the lane change to the passing lane, the normal adaptive cruise control may be performed. For example, in a case where a preceding vehicle is newly recognized ahead of the own vehicle M on the lane after the lane change, the traveling ECU 14 may cause the own vehicle M to travel to follow the preceding vehicle. In a case where no preceding vehicle is recognized ahead of the own vehicle M on the lane after the lane change, the traveling ECU 14 may cause the own vehicle M to travel at constant speed at the set vehicle speed Vs.

In one embodiment, the traveling ECU 14 may thus serve as an "adaptive cruise controller".

Figure 3:
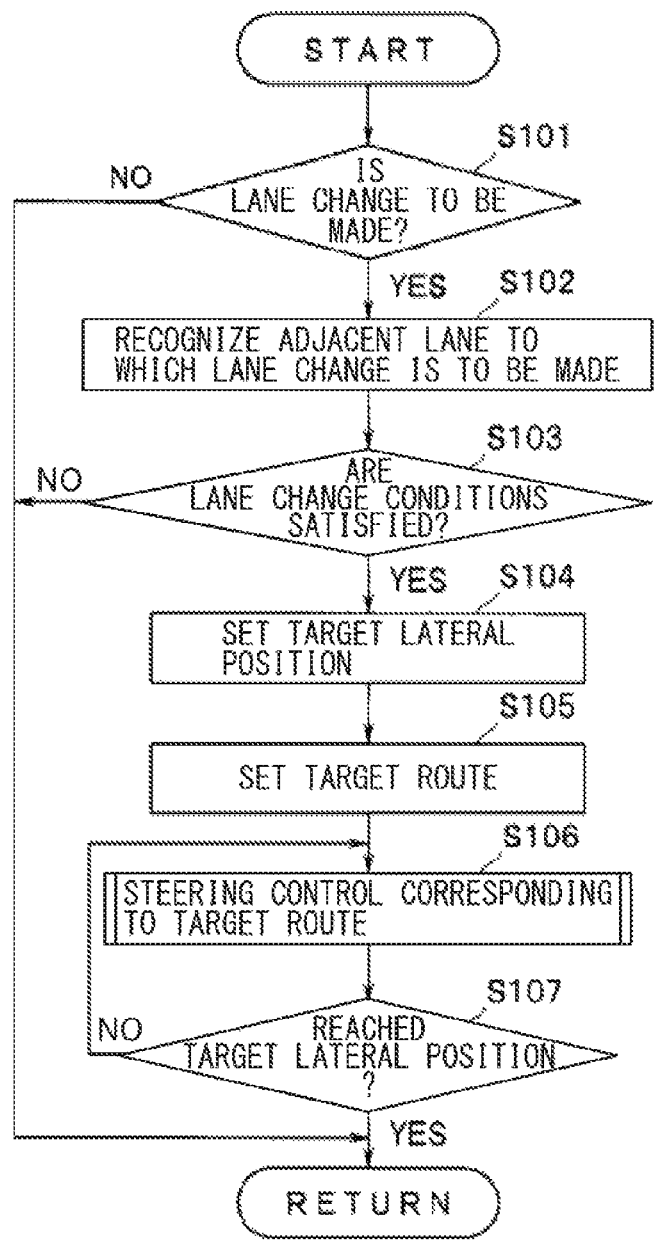
FIG. 3 is a flowchart illustrating a lane change control routine.

A description is given next of the lane change control described above, with reference to a flowchart of a lane change control routine in FIG. 3. This lane change control routine may be repeatedly executed every set time period by the traveling ECU 14, for example, while the second traveling control mode is selected.

Upon start of the routine, the traveling ECU 14 may check, in step S101, whether a lane change is to be made at present. The traveling ECU 14 may determine whether a lane change is to be made on the basis of, for example, whether the turn signal switch is operated by the driver, whether the vehicle speed Vl of the preceding vehicle is lower than the set vehicle speed Vs of the own vehicle M in a predetermined degree, or whether a subsequent vehicle with the vehicle speed Vf higher than the vehicle speed V of the own vehicle M in a predetermined degree is approaching the own vehicle M.

If the traveling ECU 14 determines in step S101 that a lane change does not have to be made (step S101: NO), the traveling ECU 14 may exit the routine.

If the traveling ECU 14 determines in step S101 that a lane change is to be made (step S101: YES), the traveling ECU 14 may cause the flow to proceed to step S102.

In step S102, the traveling ECU 14 may recognize an adjacent lane to which the lane change is to be made. For example, the traveling ECU 14 may recognize lane lines that define the adjacent lane, on the basis of the traveling environment information. The traveling ECU 14 may also recognize whether an object such as another vehicle is present on the adjacent lane.

In subsequent step S103, the traveling ECU 14 may check whether lane change conditions are satisfied. For example, the traveling ECU 14 may determine whether a lane change is possible on the basis of whether a section on the road where the own vehicle M is traveling is a section in which a lane change is allowed, and whether another vehicle is present on the adjacent lane to which the lane change is to be made.

If the traveling ECU 14 determines in step S103 that the lane change conditions are not satisfied (step S103: NO), the traveling ECU 14 may exit the routine.

If the traveling ECU 14 determines in step S103 that the lane change conditions are satisfied (step S103: YES), the traveling ECU 14 may cause the flow to proceed to step S104.

In step S104, the traveling ECU 14 may set the target lateral position to be used when the own vehicle M makes the lane change. For example, the traveling ECU 14 may set, as the target lateral position, the middle of the adjacent lane calculated on the basis of the left and right lane lines that define the adjacent lane.

In subsequent step S105, the traveling ECU 14 may set the target route that allows the own vehicle M to make the lane change to the target lateral position.

In subsequent step S106, the traveling ECU 14 may drive the electric power steering motor 35 via the PS ECU 25 to perform a steering control corresponding to the target route.

When the flow proceeds from step S106 to step S107, the traveling ECU 14 may check whether the own vehicle M has reached the target lateral position.

If the traveling ECU 14 determines in step S107 that the own vehicle M has not reached the target lateral position (step S107: NO), the traveling ECU 14 may cause the flow to return to step S106.

If the traveling ECU 14 determines in step S107 that the own vehicle M has reached the target lateral position (step S107: YES), the traveling ECU 14 may exit the routine.

Figure 4:
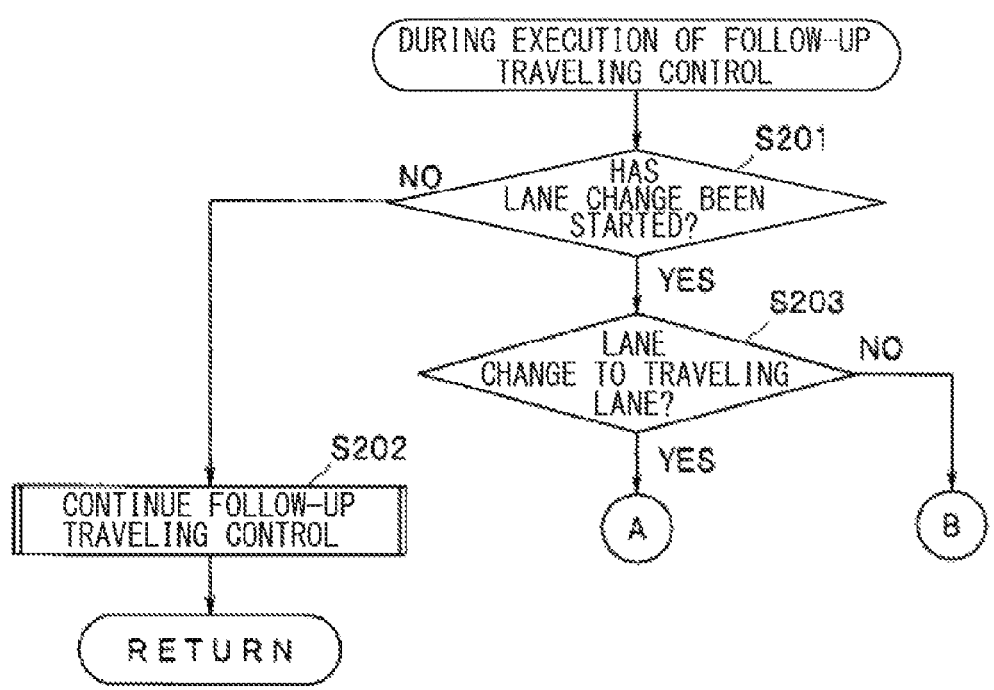
FIG. 4 is a first part of a flowchart illustrating a vehicle speed control routine involving a lane change during a follow-up traveling control.
Figure 5:
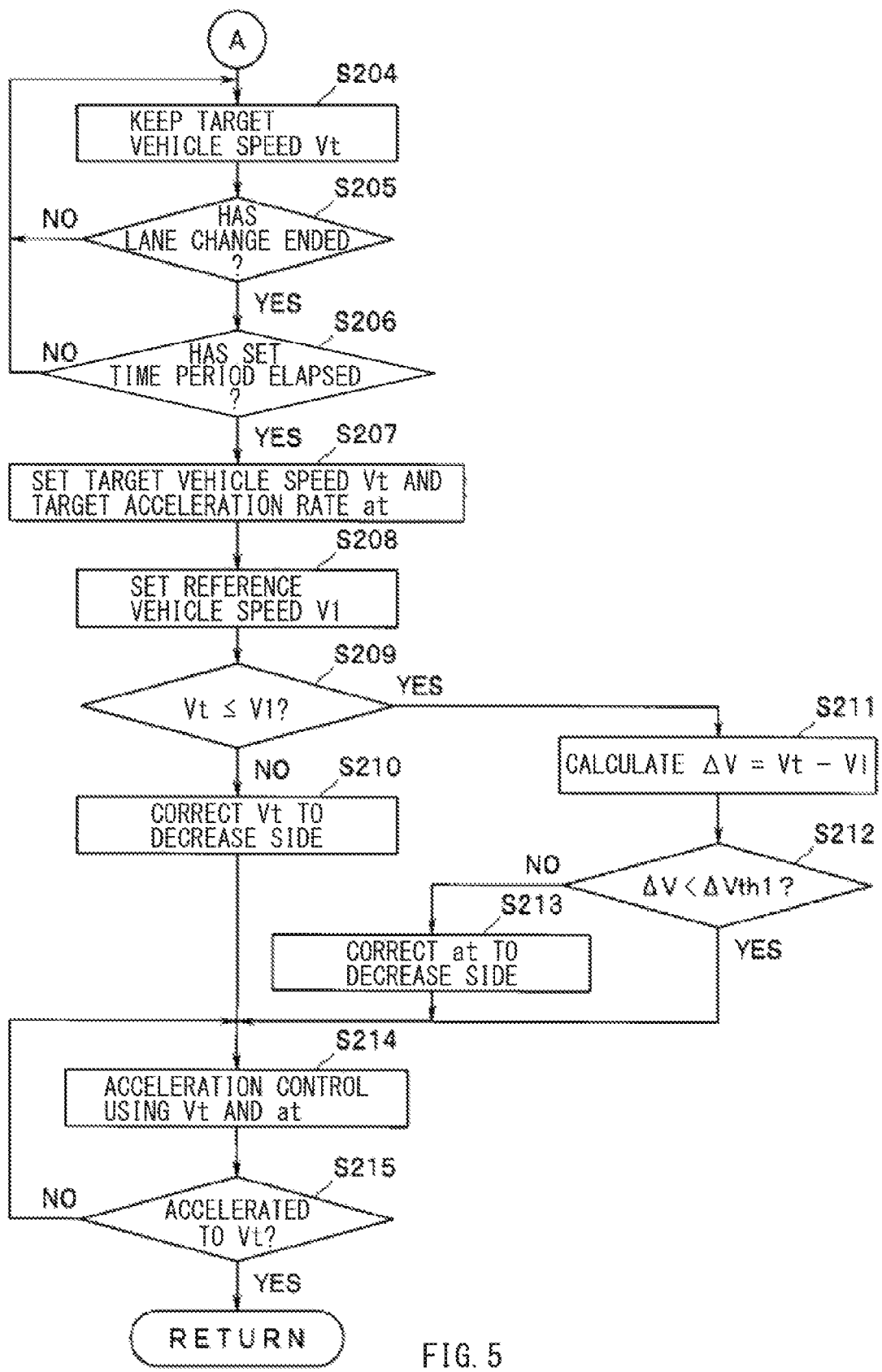
FIG. 5 is a second part of the flowchart illustrating the vehicle speed control routine involving the lane change during the follow-up traveling control.
Figure 6:
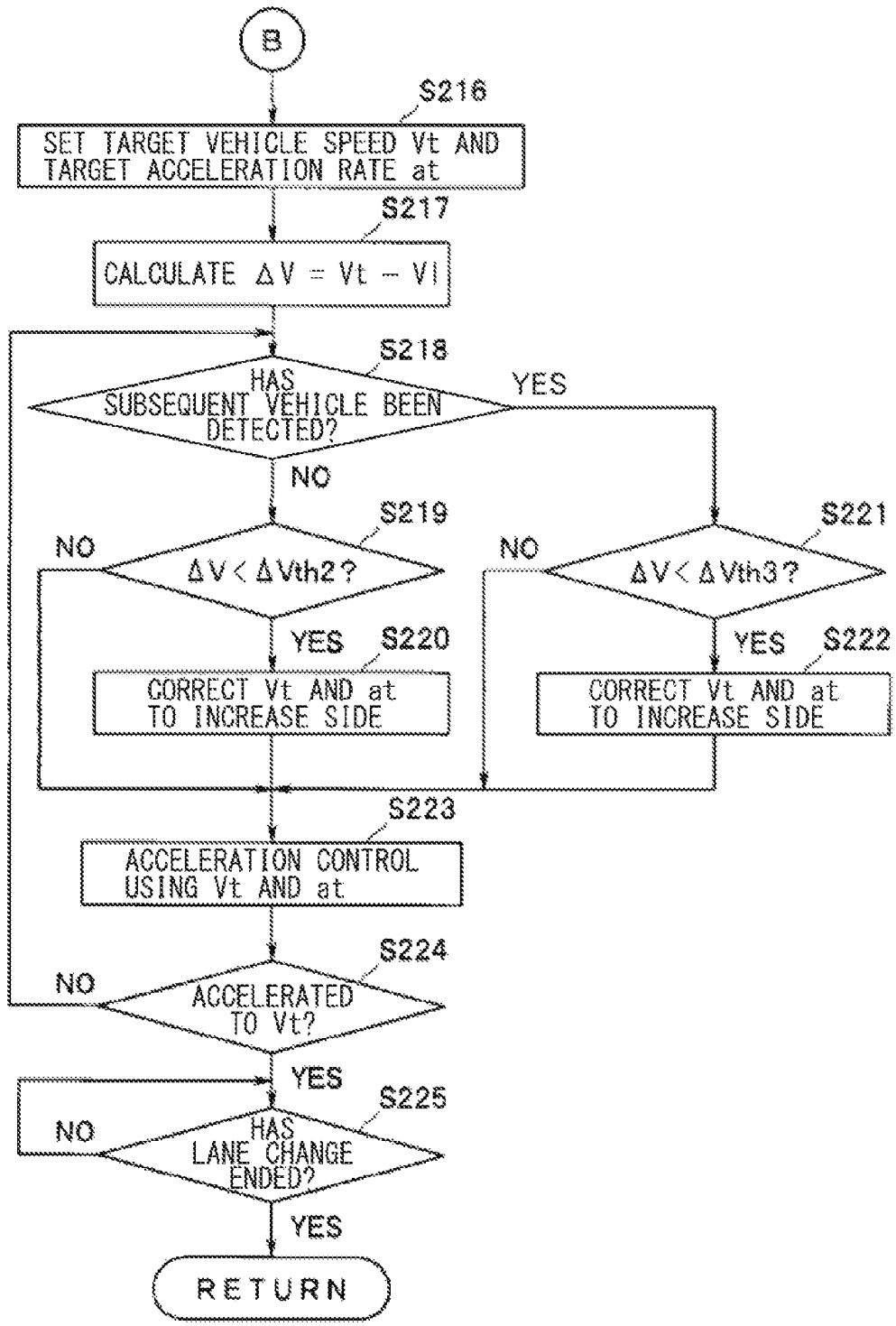
FIG. 6 is a third part of the flowchart illustrating the vehicle speed control routine involving the lane change during the follow-up traveling control.

A description is given next of the vehicle speed control involving a lane change during the follow-up traveling control, with reference to a flowchart of a vehicle speed control routine in FIGS. 4 to 6. This routine may be repeatedly executed every set time period by the traveling ECU 14 during the follow-up traveling control.

Upon start of the routine, the traveling ECU 14 may check, in step S201, whether a lane change has been started.

If the traveling ECU 14 determines in step S201 that a lane change has not been started (step S201: NO), the traveling ECU 14 may cause the flow to proceed to step S202. In step S202, the traveling ECU 14 may continue the follow-up traveling control, and thereafter exit the routine.

If the traveling ECU 14 determines in step S201 that a lane change has been started (step S201: YES), the traveling ECU 14 may cause the flow to proceed to step S203. In step S203, the traveling ECU 14 may check whether a lane to which the lane change of the own vehicle M is to be made is the traveling lane.

If the traveling ECU 14 determines in step S203 that the lane to which the lane change is to be made is the traveling lane (step S203: YES), the traveling ECU 14 may cause the flow to proceed to step S204. In step S204, the traveling ECU 14 may perform the vehicle speed control keeping the target vehicle speed Vt at the start of the lane change.

In subsequent step S205, the traveling ECU 14 may check whether the lane change of the own vehicle M to the traveling lane has ended.

If the traveling ECU 14 determines in step S205 that the lane change has not ended (step S205: NO), the traveling ECU 14 may cause the flow to return to step S204.

If the traveling ECU 14 determines in step S205 that the lane change has ended (step S205: YES), the traveling ECU 14 may cause the flow to proceed to step S206. In step S206, the traveling ECU 14 may check whether a set time period (e.g., about several seconds) has elapsed after the lane change.

If the traveling ECU 14 determines in step S206 that the set time period has not elapsed (step S206: NO), the traveling ECU 14 may cause the flow to return to step S204.

If the traveling ECU 14 determines in step S206 that the set time period has elapsed (step S206: YES), the traveling ECU 14 may cause the flow to proceed to step S207. In step S207, the traveling ECU 14 may set, for example, the set vehicle speed Vs as the new target vehicle speed Vt. The traveling ECU 14 may also set the target acceleration rate at on the basis of the new target vehicle speed Vt.

In subsequent step S208, the traveling ECU 14 may set the reference vehicle speed V1 on the basis of, for example, the average vehicle speed of the one or more surrounding vehicles.

When the flow proceeds from step S208 to step S209, the traveling ECU 14 may check whether the target vehicle speed Vt is equal to or less than the reference vehicle speed V1.

If the traveling ECU 14 determines in step S209 that the target vehicle speed Vt is greater than the reference vehicle speed Vl (step S209: NO), the traveling ECU 14 may cause the flow to proceed to step S210. In step S210, the traveling ECU 14 may correct the target vehicle speed Vt to the decrease side by a preset decrease amount, and thereafter cause the flow to proceed to step S214.

If the traveling ECU 14 determines in step S209 that the target vehicle speed Vt is equal to or less than the reference vehicle speed Vl (step S209: YES), the traveling ECU 14 may cause the flow to proceed to step S211. In step S211, the traveling ECU 14 may calculate the speed difference ΔV by subtracting, from the target vehicle speed Vt, the vehicle speed Vl of the vehicle that has been the preceding vehicle.

In subsequent step S212, the traveling ECU 14 may check whether the speed difference ΔV is less than the preset first threshold ΔVth1.

If the traveling ECU 14 determines in step S212 that the speed difference ΔV is equal to or greater than the first threshold ΔVth1 (step S212: NO), the traveling ECU 14 may cause the flow to proceed to step S213. In step S213, the traveling ECU 14 may correct the target vehicle speed Vt to the decrease side by a preset decrease amount. The traveling ECU 14 may further correct the target acceleration rate at based on the corrected target vehicle speed Vt to the decrease side by a preset decrease amount.

If the traveling ECU 14 determines in step S212 that the speed difference ΔV is less than the first threshold ΔVth1 (step S212: YES), the traveling ECU 14 may cause the flow to proceed to step S214, without correcting the target vehicle speed Vt (and the target acceleration rate at).

When the flow proceeds from step S210, step S212, or step S213 to step S214, the traveling ECU 14 may perform an acceleration control using the new target acceleration rate at (including the corrected value).

In subsequent step S215, the traveling ECU 14 may check whether the vehicle speed V of the own vehicle M has reached the new target vehicle speed Vt (including the corrected value).

If the traveling ECU 14 determines in step S215 that the vehicle speed V of the own vehicle M has not reached the new target vehicle speed Vt (step S215: NO), the traveling ECU 14 may cause the flow to return to step S214.

If the traveling ECU 14 determines in step S215 that the vehicle speed V of the own vehicle M has reached the new target vehicle speed Vt (step S215: YES), the traveling ECU 14 may exit the routine.

If the traveling ECU 14 determines in step S203 that the lane to which the lane change is to be made is the passing lane (step S203: NO), the traveling ECU 14 may cause the flow to proceed to step S216.

In step S216, the traveling ECU 14 may set, for example, the set vehicle speed Vs as the new target vehicle speed Vt. The traveling ECU 14 may also set the target acceleration rate at on the basis of the new target vehicle speed Vt.

In subsequent step S217, the traveling ECU 14 may calculate the speed difference ΔV by subtracting, from the target vehicle speed Vt, the vehicle speed Vl of the vehicle that has been the preceding vehicle.

When the flow proceeds from step S217 to step S218, the traveling ECU 14 may check whether a subsequent vehicle has been detected on the passing lane to which the lane change is to be made.

If the traveling ECU 14 determines in step S218 that no subsequent vehicle has been detected (step S218: NO), the traveling ECU 14 may cause the flow to proceed to step S219. In step S219, the traveling ECU 14 may check whether the speed difference ΔV is less than the preset second threshold ΔVth2.

If the traveling ECU 14 determines in step S219 that the speed difference ΔV is less than the second threshold ΔVth2 (step S219: YES), the traveling ECU 14 may cause the flow to proceed to step S220. In step S220, the traveling ECU 14 may correct the target vehicle speed Vt to the increase side, for example, with the legal speed limit set as the upper limit. The traveling ECU 14 may also correct the target acceleration rate at to the increase side in accordance with the correction of the target vehicle speed Vt to the increase side. In a case where the legal speed limit and the target vehicle speed Vt match each other or in a case where a speed difference between the legal speed limit and the target vehicle speed Vt is small, it is difficult to sufficiently correct the target vehicle speed Vt to the increase side. In such a case, the traveling ECU 14 may separately correct the target acceleration rate at to the increase side.

If the traveling ECU 14 determines in step S219 that the speed difference ΔV is equal to or greater than the second threshold ΔVth2 (step S219: NO), the traveling ECU 14 may cause the flow to proceed to step S223, without correcting the target vehicle speed Vt and the target acceleration rate at.

If the traveling ECU 14 determines in step S218 that a subsequent vehicle has been detected (step S218: YES), the traveling ECU 14 may cause the flow to proceed to step S221. In step S221, the traveling ECU 14 may check whether the speed difference ΔV is less than the preset third threshold ΔVth3.

If the traveling ECU 14 determines in step S221 that the speed difference ΔV is less than the third threshold ΔVth3 (step S221: YES), the traveling ECU 14 may cause the flow to proceed to step S222. In step S222, the traveling ECU 14 may correct the target vehicle speed Vt to the increase side, for example, with the legal speed limit set as the upper limit. The traveling ECU 14 may also correct the target acceleration rate at to the increase side in accordance with the correction of the target vehicle speed Vt to the increase side. In a case where the legal speed limit and the target vehicle speed Vt match each other or in a case where a speed difference between the legal speed limit and the target vehicle speed Vt is small, it is difficult to sufficiently correct the target vehicle speed Vt to the increase side. In such a case, the traveling ECU 14 may separately correct the target acceleration rate at to the increase side.

If the traveling ECU 14 determines in step S221 that the speed difference ΔV is equal to or greater than the third threshold ΔVth3 (step S221: NO), the traveling ECU 14 may cause the flow to proceed to step S223, without correcting the target vehicle speed Vt and the target acceleration rate at.

When the flow proceeds from step S219, step S220, step S221, or step S222 to step S223, the traveling ECU 14 may perform the acceleration control for the own vehicle M, by using the newly set target vehicle speed Vt (including the corrected value) and the newly set target acceleration rate at (including the corrected value).

In subsequent step S224, the traveling ECU 14 may check whether the vehicle speed V of the own vehicle M has been increased to the target vehicle speed Vt.

If the traveling ECU 14 determines in step S224 that the vehicle speed V of the own vehicle M has not been increased to the target vehicle speed Vt (step S224: NO), the traveling ECU 14 may cause the flow to return to step S218.

If the traveling ECU 14 determines in step S224 that the vehicle speed V of the own vehicle M has been increased to the target vehicle speed Vt (step S224: YES), the traveling ECU 14 may cause the flow to proceed to step S225. In step S225, the traveling ECU 14 may check whether the lane change of the own vehicle M to the passing lane has ended.

If the traveling ECU 14 determines in step S225 that the lane change has not ended (step S225: NO), the traveling ECU 14 may be put on standby.

If the traveling ECU 14 determines in step S225 that the lane change has ended (step S225: YES), the traveling ECU 14 may exit the routine.

Figure 7:
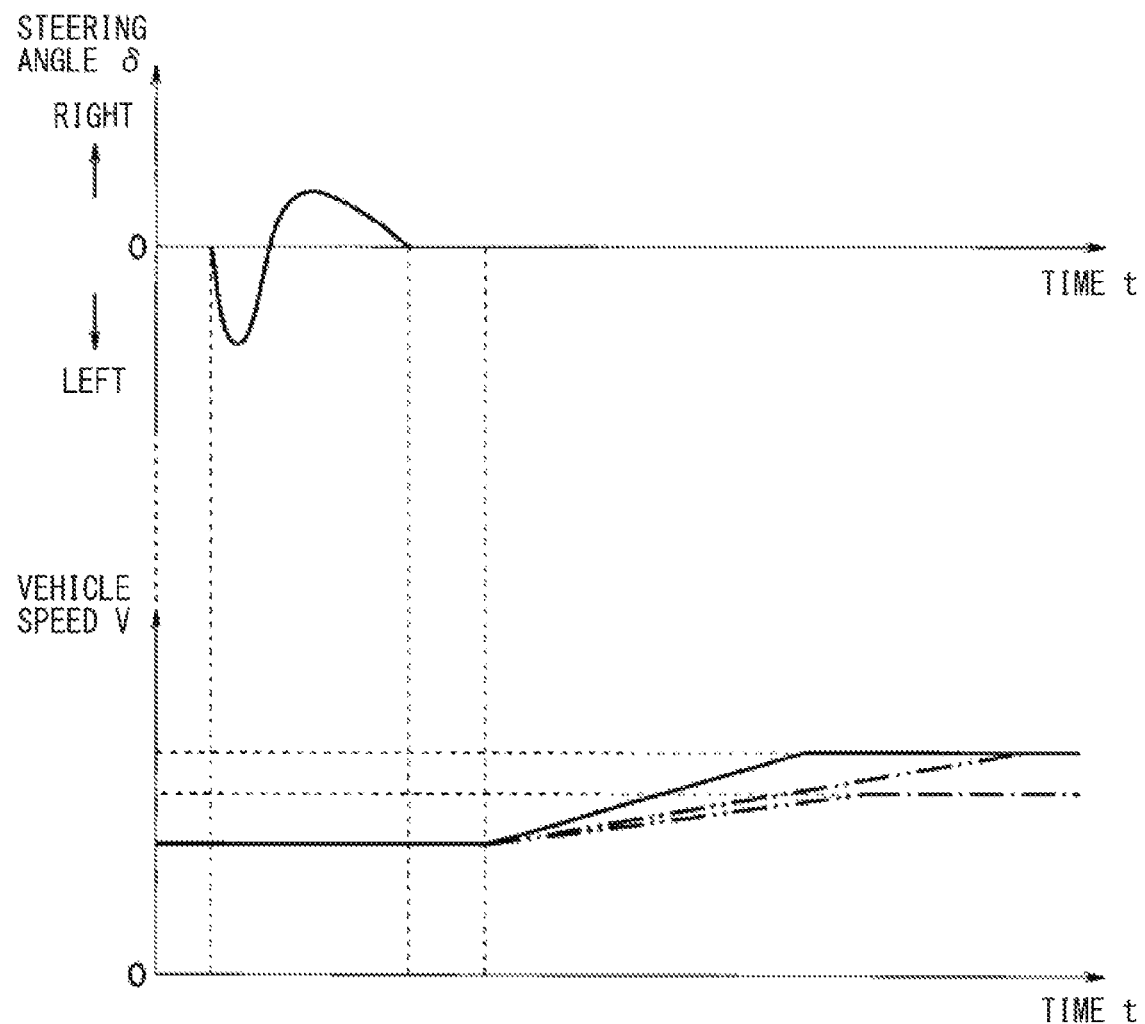
FIG. 7 is a time chart illustrating an example of steering angle and vehicle speed characteristics at the time of a lane change to a traveling lane.

According to such an example embodiment, in a case where the own vehicle M starts a lane change to the traveling lane during traveling based on the follow-up traveling control, the traveling ECU 14 keeps the target vehicle speed Vt at the start of the lane change at least until the lane change ends, and thereafter accelerates the own vehicle M by setting the set vehicle speed Vs as the new target vehicle speed Vt and setting the target acceleration rate at based on the new target vehicle speed Vt (see a solid line in FIG. 7).

Figure 9:
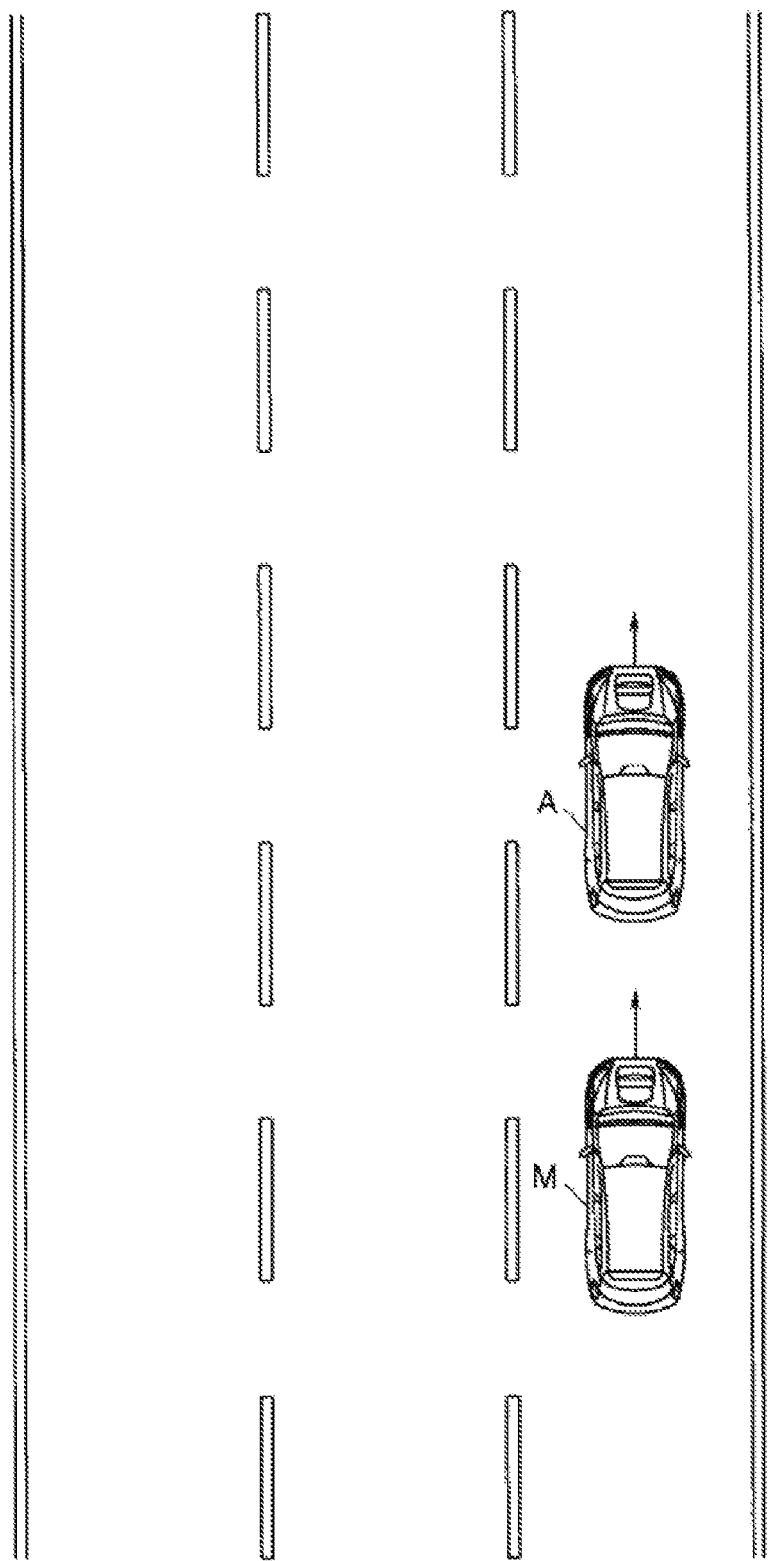
FIG. 9 is an explanatory diagram illustrating the own vehicle traveling to follow a preceding vehicle on the passing lane.
Figure 10:
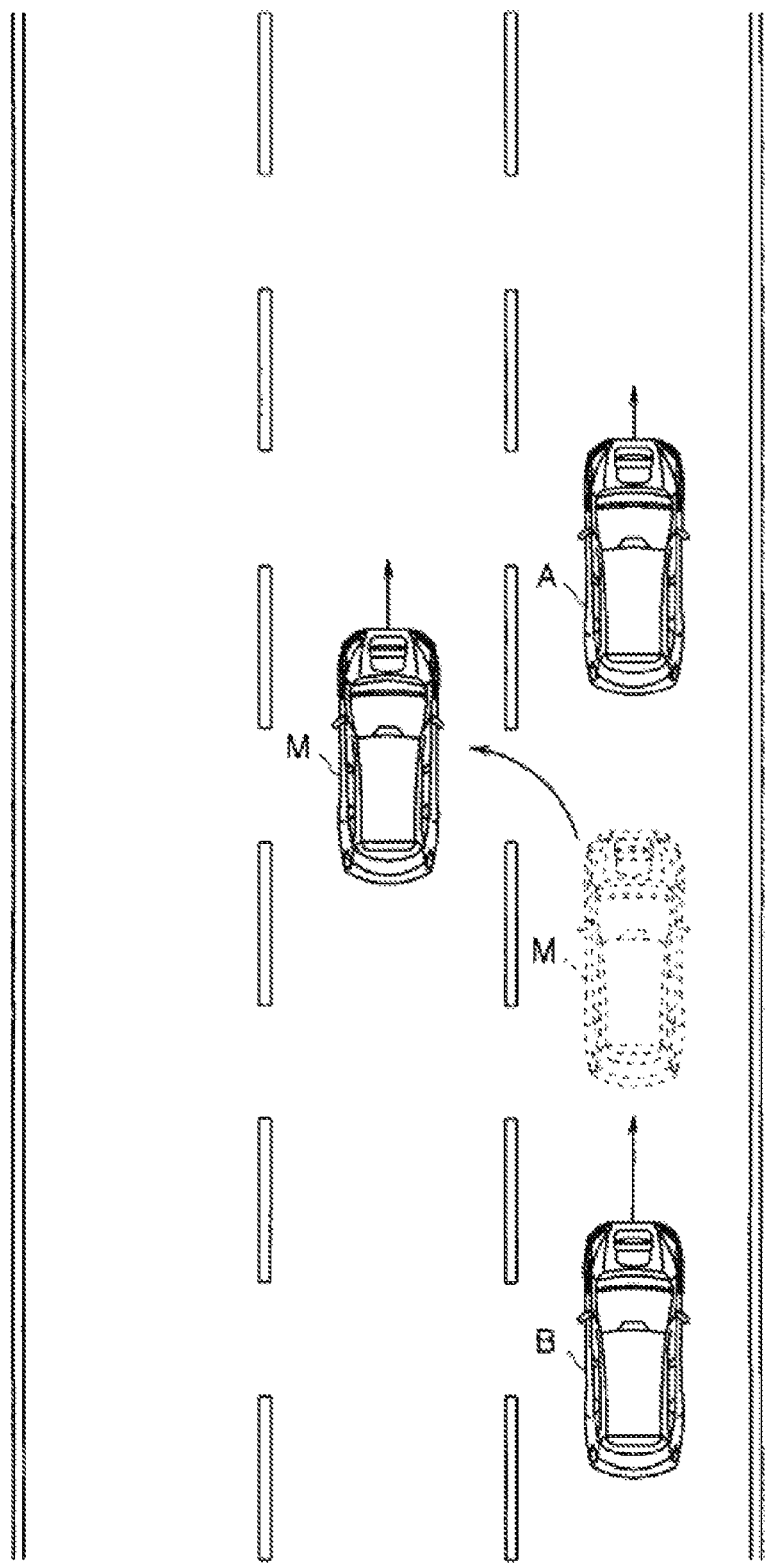
FIG. 10 is an explanatory diagram illustrating the own vehicle during the lane change to the traveling lane.
Figure 11:
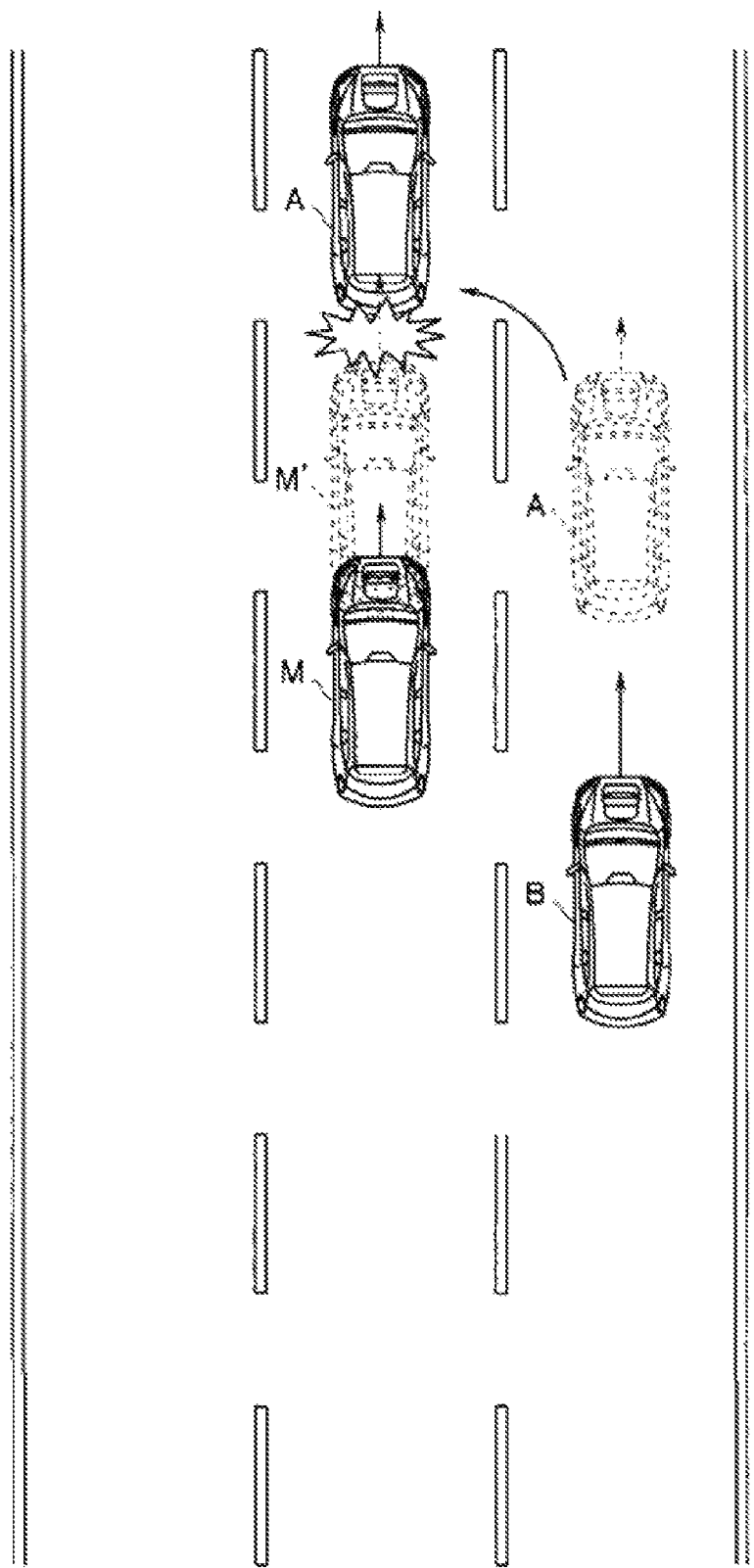
FIG. 11 is an explanatory diagram illustrating the own vehicle after the lane change to the traveling lane.

This makes it possible to delay the time taken until the own vehicle M after the lane change travels parallel beside a vehicle A that has been the preceding vehicle before the lane change (see a relationship between the own vehicle M and the vehicle A in FIGS. 9 and 10). This makes it possible to cause the vehicle A that has been the preceding vehicle to accurately recognize that the own vehicle M has made the lane change. In addition, even if the vehicle A that has been the preceding vehicle makes a lane change to the traveling lane without noticing the presence of the own vehicle M (see FIG. 11), it is possible to secure the time for the own vehicle M to avoid contact with the vehicle A that has made the lane change, by emergency braking, for example, unlike in a case of the own vehicle M' illustrated in FIG. 11.

After the lane change to the traveling lane, in a case where the new target vehicle speed Vt is higher than the average vehicle speed of the one or more surrounding vehicles around the own vehicle M, i.e., the reference vehicle speed V1, the traveling ECU 14 may correct the new target vehicle speed Vt to the decrease side.

This enables the own vehicle M to travel at the vehicle speed V suitable for the traffic flow, without being accelerated to an excessive vehicle speed even after the lane change (see a dashed and single-dotted line in FIG. 7).

After the lane change to the traveling lane, in a case where the new target vehicle speed is equal to or less than the average vehicle speed, i.e., the reference vehicle speed V1, and where the speed difference ΔV between the new target vehicle speed Vt and the vehicle speed of the vehicle that has been the preceding vehicle is equal to or greater than the preset first threshold ΔVth1, the traveling ECU 14 may correct one or both of the new target vehicle speed Vt and the target acceleration rate at based on the new target vehicle speed Vt to the decrease side (see the dashed and single-dotted line and a dashed and double-dotted line in FIG. 7).

This makes it possible to delay the time taken until the own vehicle M after the lane change travels parallel beside the vehicle that has been the preceding vehicle before the lane change. This makes it possible to cause the vehicle that has been the preceding vehicle to accurately recognize that the own vehicle M has made the lane change. In addition, even if the vehicle that has been the preceding vehicle makes a lane change to the traveling lane without noticing the presence of the own vehicle M, it is possible to secure the time for the own vehicle M to avoid contact with the vehicle that has made the lane change, by emergency braking, for example.

Figure 8:
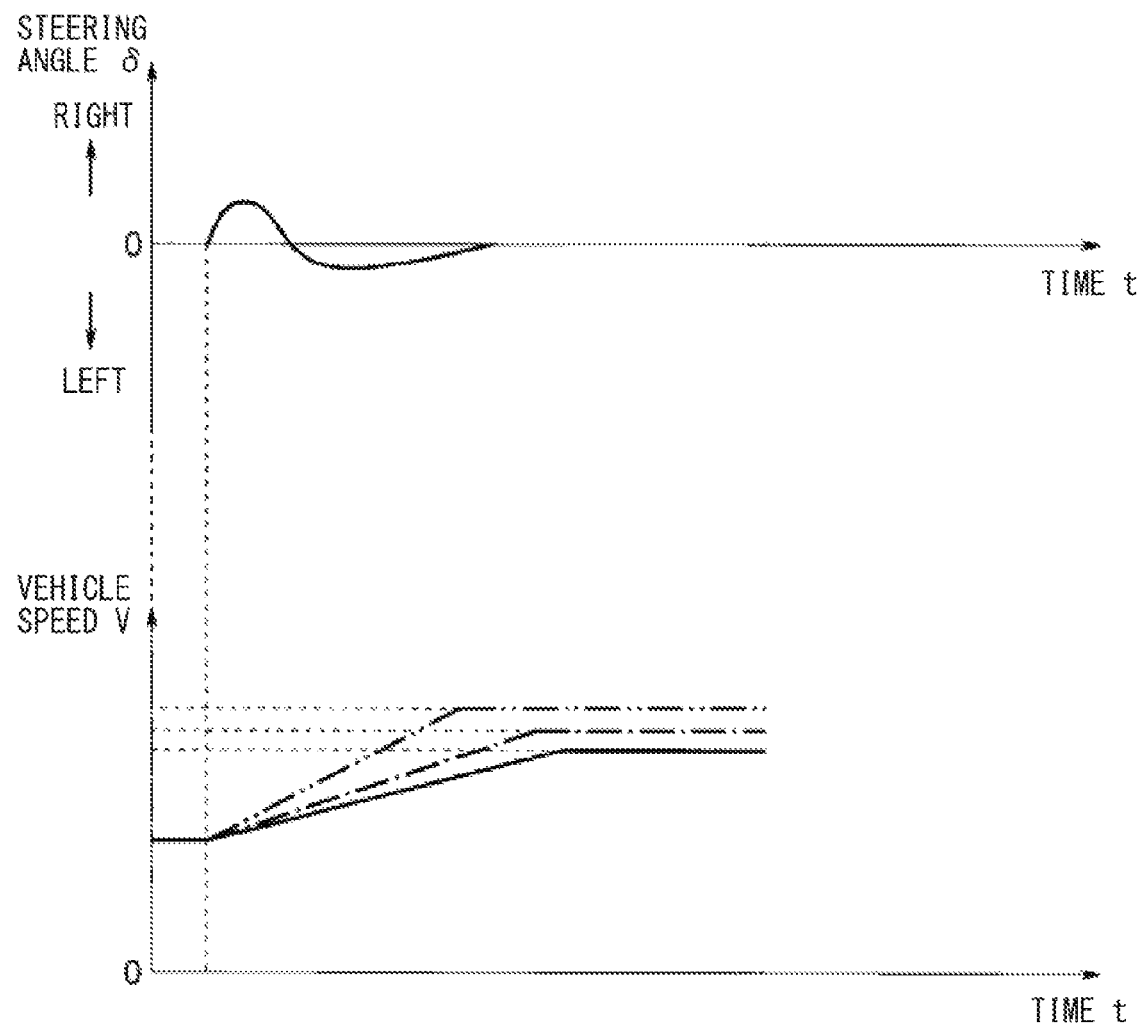
FIG. 8 is a time chart illustrating an example of steering angle and vehicle speed characteristics at the time of a lane change to a passing lane.

In a case where the own vehicle M starts a lane change to the passing lane during the traveling based on the follow-up traveling control, the traveling ECU 14 may accelerate the own vehicle M in parallel with the lane change, by setting the set vehicle speed Vs as the new target vehicle speed and setting the target acceleration rate at based on the new target vehicle speed (see a solid line in FIG. 8).

Figure 12:
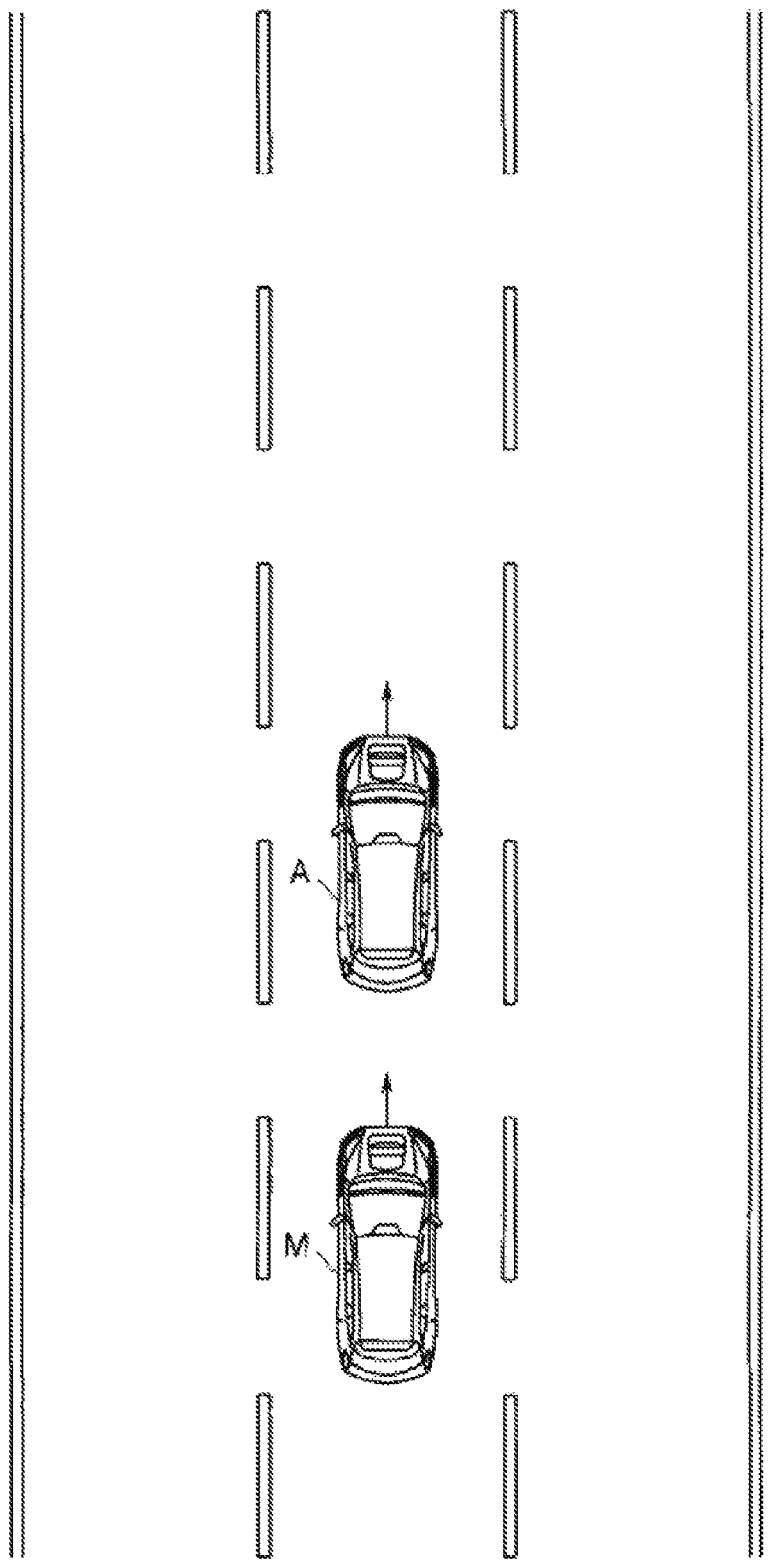
FIG. 12 is an explanatory diagram illustrating the own vehicle traveling to follow a preceding vehicle on the traveling lane.
Figure 13:
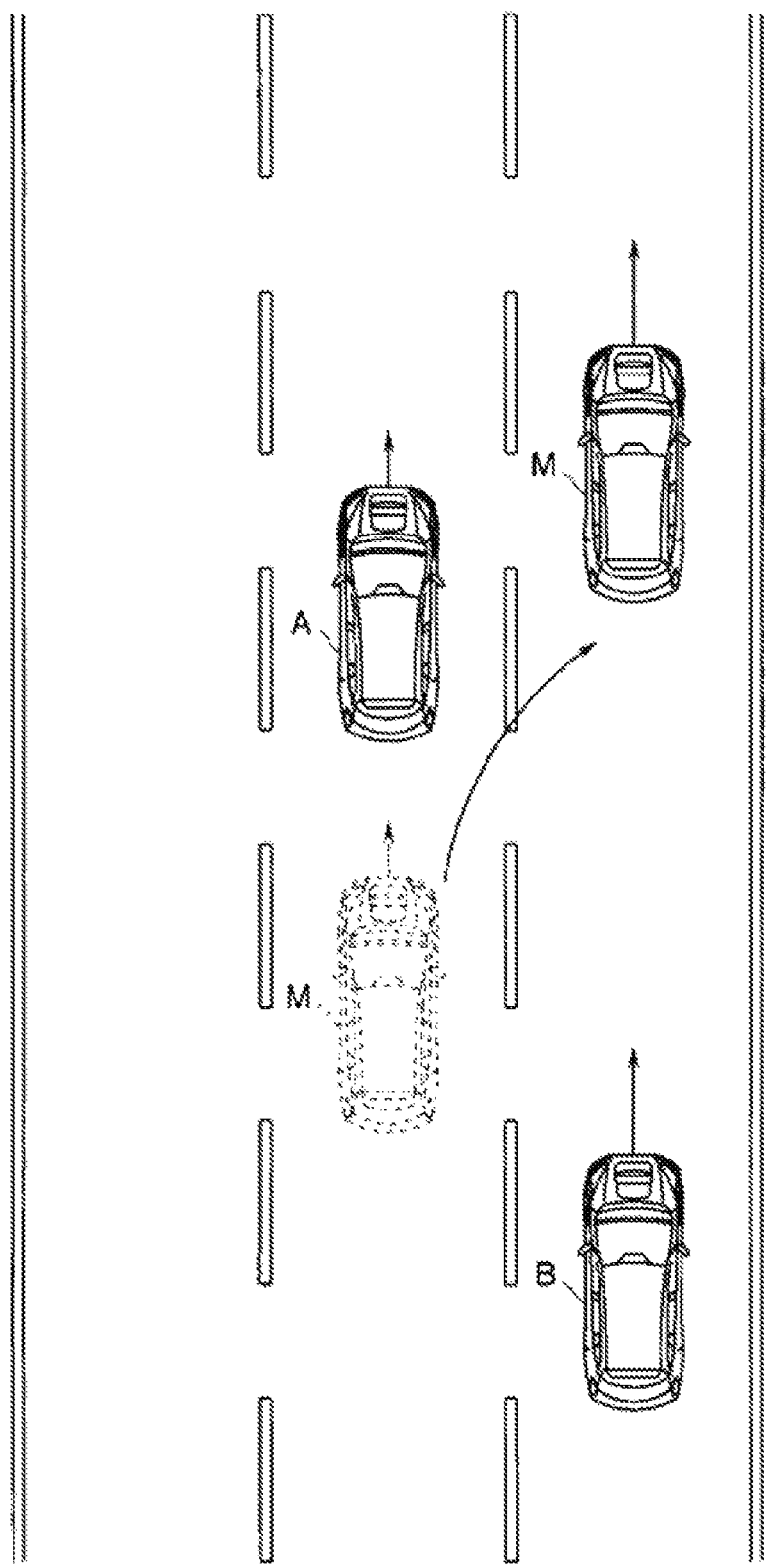
FIG. 13 is an explanatory diagram illustrating the own vehicle during the lane change to the passing lane.
Figure 14:
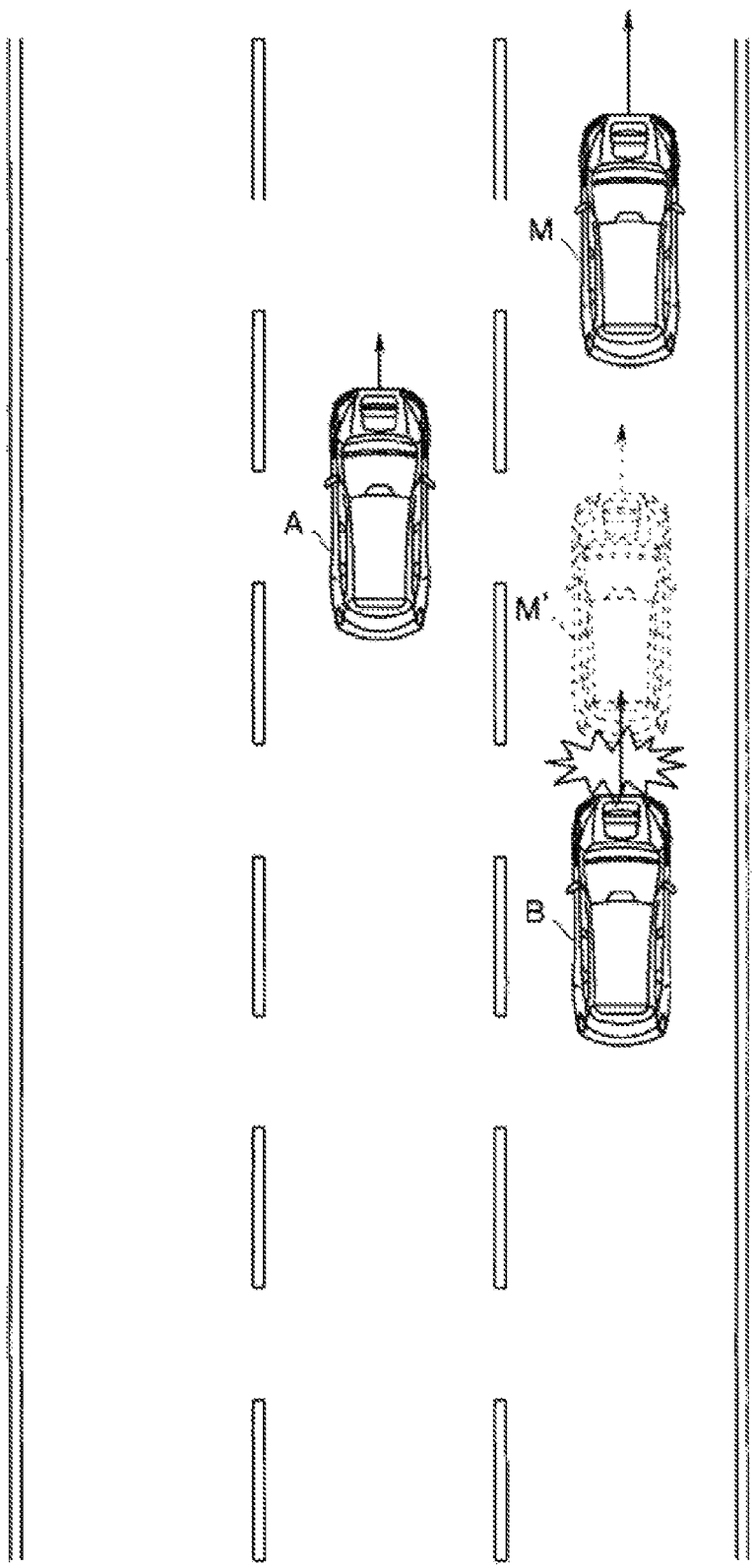
FIG. 14 is an explanatory diagram illustrating the own vehicle after the lane change to the passing lane.

This makes it possible to, at the time of the lane change to the passing lane, quickly accelerate to pass the vehicle A that has been the preceding vehicle (see FIGS. 12 and 13).

In this case, in a case where the speed difference ΔV between the new target vehicle speed Vt and the vehicle speed Vl of the preceding vehicle is small in a predetermined degree, the traveling ECU 14 may correct the new target vehicle speed Vt to a vehicle speed equal to or greater than the set vehicle speed Vs, and correct the target acceleration rate at to the increase side.

This makes it possible to accurately achieve quick acceleration. In the correction, the correction amounts for the new target vehicle speed Vt and the new target acceleration rate at may be made relatively larger in a case where a subsequent vehicle is detected (see a dashed and double-dotted line in FIG. 8) than in a case where no subsequent vehicle is detected (see a dashed and single-dotted line in FIG. 8). This makes it possible to accurately prevent interference with a subsequent vehicle B, unlike in a case of the own vehicle M' (see FIG. 14).

In the example embodiments described above, the image recognition ECU 13, the traveling ECU 14, the CP ECU 21, the E/G ECU 22, the T/M ECU 23, the BK ECU 24, and the PS ECU 25 may include a known microcomputer and peripheral equipment thereof. The known microcomputer may include a CPU, a RAM, a ROM, and a nonvolatile storage, for example. The ROM may store, in advance, fixed data such as a program to be executed by the CPU or a data table. All or a part of functions of the image recognition ECU 13, the traveling ECU 14, the CP ECU 21, the E/G ECU 22, the T/M ECU 23, the BK ECU 24, and the PS ECU 25 may be configured by a logic circuit or an analog circuit. Processing of various programs may be implemented by an electronic circuit such as a FPGA.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Further, the foregoing example embodiments each include various stages of the disclosure, and various embodiments of the disclosure may be extracted by appropriately combining the features of the disclosure disclosed herein.

For example, the vehicle speed control described above may also be performed while the first traveling control mode is selected, without being limited to while the second traveling control mode is selected.

Further, in a case where the above-described concerns may be addressed and the above-described effects may be obtained even if some features are deleted from all the features disclosed in the foregoing example embodiments, the remaining features may be extracted as one embodiment of the disclosure.

The vehicle driving assistance apparatus according to at least one embodiment of the disclosure makes it possible to appropriately avoid interference with a surrounding vehicle on a new lane after a lane change.

Each of the image recognition ECU 13 and the traveling ECU 14 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the image recognition ECU 13 and the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the image recognition ECU 13 and the traveling ECU 14 illustrated in FIG. 1.

The invention claimed is:

1. A vehicle driving assistance apparatus comprising:
a traveling environment recognizer configured to recognize traveling environment information regarding an outside of a first vehicle to which the vehicle driving assistance apparatus is to be applied; and
an adaptive cruise controller configured to, on a basis of the traveling environment information recognized by the traveling environment recognizer, perform, in a case where a preceding vehicle is recognized ahead of the first vehicle, a follow-up traveling control of causing the first vehicle to travel to follow the preceding vehicle at a target vehicle speed set depending on a vehicle speed of the preceding vehicle, and perform, in a case where no preceding vehicle is recognized ahead of the first vehicle, a constant-speed traveling control of causing the first vehicle to travel at constant speed by setting, as the target vehicle speed, a set vehicle speed inputted by a driver who drives the first vehicle, wherein
the adaptive cruise controller is configured to, in a case where the first vehicle starts a lane change to a traveling lane during traveling based on the follow-up traveling control, keep the target vehicle speed at a start of the lane change at least until the lane change ends, and thereafter accelerate the first vehicle, by setting the set vehicle speed as a new target vehicle speed, and setting a target acceleration rate based on the new target vehicle speed.

2. The vehicle driving assistance apparatus according to claim 1, wherein the adaptive cruise controller is configured to, after the lane change to the traveling lane, correct the new target vehicle speed to a decrease side, in a case where the new target vehicle speed is higher than an average vehicle speed of one or more surrounding vehicles around the first vehicle.

3. The vehicle driving assistance apparatus according to claim 1, wherein the adaptive cruise controller is configured to, after the lane change to the traveling lane, correct one or both of the new target vehicle speed and the target acceleration rate based on the new target vehicle speed to a decrease side, in a case where the new target vehicle speed is equal to or less than an average vehicle speed of one or more surrounding vehicles around the first vehicle, and where a speed difference between the new target vehicle speed and a vehicle speed of a second vehicle that has been the preceding vehicle is equal to or greater than a preset first threshold.

4. The vehicle driving assistance apparatus according to claim 2, wherein the adaptive cruise controller is configured to, after the lane change to the traveling lane, correct one or both of the new target vehicle speed and the target acceleration rate based on the new target vehicle speed to a decrease side, in a case where the new target vehicle speed is equal to or less than the average vehicle speed of one or more surrounding vehicles around the first vehicle, and where a speed difference between the new target vehicle speed and a vehicle speed of a second vehicle that has been the preceding vehicle is equal to or greater than a preset first threshold.

5. The vehicle driving assistance apparatus according to claim 1, wherein the adaptive cruise controller is configured to, in a case where the first vehicle starts a lane change to a passing lane during the traveling based on the follow-up traveling control, accelerate the first vehicle in parallel with the lane change by setting the set vehicle speed as the new target vehicle speed and setting the target acceleration rate based on the new target vehicle speed.

6. The vehicle driving assistance apparatus according to claim 2, wherein the adaptive cruise controller is configured to, in a case where the first vehicle starts a lane change to a passing lane during the traveling based on the follow-up traveling control, accelerate the first vehicle in parallel with the lane change by setting the set vehicle speed as the new target vehicle speed and setting the target acceleration rate based on the new target vehicle speed.

7. The vehicle driving assistance apparatus according to claim 3, wherein the adaptive cruise controller is configured to, in a case where the first vehicle starts a lane change to a passing lane during the traveling based on the follow-up traveling control, accelerate the first vehicle in parallel with the lane change by setting the set vehicle speed as the new target vehicle speed and setting the target acceleration rate based on the new target vehicle speed.

8. The vehicle driving assistance apparatus according to claim 4, wherein the adaptive cruise controller is configured to, in a case where the first vehicle starts a lane change to a passing lane during the traveling based on the follow-up traveling control, accelerate the first vehicle in parallel with the lane change by setting the set vehicle speed as the new target vehicle speed and setting the target acceleration rate based on the new target vehicle speed.

9. The vehicle driving assistance apparatus according to claim 5, wherein the adaptive cruise controller is configured to set the new target vehicle speed to a vehicle speed equal to or greater than the set vehicle speed, in a case where a subsequent vehicle is recognized on the passing lane after the lane change to the passing lane is started.

10. The vehicle driving assistance apparatus according to claim 6, wherein the adaptive cruise controller is configured to set the new target vehicle speed to a vehicle speed equal to or greater than the set vehicle speed, in a case where a subsequent vehicle is recognized on the passing lane after the lane change to the passing lane is started.

11. The vehicle driving assistance apparatus according to claim 7, wherein the adaptive cruise controller is configured to set the new target vehicle speed to a vehicle speed equal to or greater than the set vehicle speed, in a case where a subsequent vehicle is recognized on the passing lane after the lane change to the passing lane is started.

12. The vehicle driving assistance apparatus according to claim 8, wherein the adaptive cruise controller is configured to set the new target vehicle speed to a vehicle speed equal to or greater than the set vehicle speed, in a case where a subsequent vehicle is recognized on the passing lane after the lane change to the passing lane is started.

13. A vehicle driving assistance apparatus comprising:
a traveling environment recognizer configured to recognize traveling environment information regarding an outside of a first vehicle to which the vehicle driving assistance apparatus is to be applied; and
circuitry configured to, on a basis of the traveling environment information recognized by the traveling environment recognizer, perform, in a case where a preceding vehicle is recognized ahead of the first vehicle, a follow-up traveling control of causing the first vehicle to travel to follow the preceding vehicle at a target vehicle speed set depending on a vehicle speed of the preceding vehicle, and perform, in a case where no preceding vehicle is recognized ahead of the first vehicle, a constant-speed traveling control of causing the first vehicle to travel at constant speed by setting, as the target vehicle speed, a set vehicle speed inputted by a driver who drives the first vehicle, wherein
the circuitry is configured to, in a case where the first vehicle starts a lane change to a traveling lane during traveling based on the follow-up traveling control, keep the target vehicle speed at a start of the lane change at least until the lane change ends, and thereafter accelerate the first vehicle, by setting the set vehicle speed as a new target vehicle speed, and setting a target acceleration rate based on the new target vehicle speed.

\* \* \* \* \*